(12) United States Patent
Cooper et al.

(10) Patent No.: US 9,262,528 B2
(45) Date of Patent: *Feb. 16, 2016

(54) INTENT MANAGEMENT TOOL FOR IDENTIFYING CONCEPTS ASSOCIATED WITH A PLURALITY OF USERS' QUERIES

(71) Applicant: Oracle OTC Subsidiary LLC, Redwood Shores, CA (US)

(72) Inventors: Edwin Riley Cooper, Oakland, CA (US); Michael Peter Dukes, Sunnyvale, CA (US); Gann Alexander Bierner, Oakland, CA (US); Filippo Ferdinando Paulo Beghelli, Glendale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,454

(22) Filed: Jul. 10, 2014

(65) Prior Publication Data

US 2014/0324812 A1    Oct. 30, 2014

Related U.S. Application Data

(63) Continuation of application No. 11/464,446, filed on Aug. 14, 2006, now Pat. No. 8,781,813.

(51) Int. Cl.
*G06F 17/27* (2006.01)
*G06F 7/00* (2006.01)
*G06F 17/30* (2006.01)

(52) U.S. Cl.
CPC ........ *G06F 17/30864* (2013.01); *G06F 17/275* (2013.01); *G06F 17/2785* (2013.01); *G06F 17/30592* (2013.01); *G06F 17/30672* (2013.01)

(58) Field of Classification Search
CPC ................ G06F 17/30864; G06F 17/30672
See application file for complete search history.

(56) References Cited

U.S. PATENT DOCUMENTS

| 4,956,774 A | 9/1990 | Shibamiya et al. |
| 5,321,833 A | 6/1994 | Chang et al. |

(Continued)

FOREIGN PATENT DOCUMENTS

| CN | 201820186 | 5/2011 |
| EP | 1104568 | 6/2001 |

(Continued)

OTHER PUBLICATIONS

Stolowitz Ford Cowger LLP, Listing of Related Cases, Aug. 19, 2009.

(Continued)

*Primary Examiner* — Farzad Kazeminezhad
(74) *Attorney, Agent, or Firm* — Kilpatrick Townsend & Stockton LLP

(57) ABSTRACT

Linguistic analysis is used to identify queries from a plurality of users over a period of time that use different natural language formations to request similar information. Common intent categories are identified for the queries requesting similar information. Intent responses can then be provided that are associated with the identified intent categories. An intent management tool can be used for identifying new intent categories, identifying obsolete intent categories, or refining existing intent categories. The said intent categories are used in identifying ontologies associated with the intent categories to help in selecting concepts as ontology parameters.

20 Claims, 16 Drawing Sheets

(56) References Cited

U.S. PATENT DOCUMENTS

| | | | |
|---|---|---|---|
| 5,357,436 A | 10/1994 | Chiu | |
| 5,383,097 A | 1/1995 | DeLucia et al. | |
| 5,386,556 A | 1/1995 | Hedin et al. | |
| 5,442,782 A | 8/1995 | Malatesta et al. | |
| 5,535,382 A | 7/1996 | Ogawa | |
| 5,608,624 A | 3/1997 | Luciw | |
| 5,625,814 A | 4/1997 | Luciw | |
| 5,694,523 A * | 12/1997 | Wical | 706/45 |
| 5,694,546 A | 12/1997 | Reisman | |
| 5,742,816 A | 4/1998 | Barr et al. | |
| 5,794,050 A | 8/1998 | Dahlgren et al. | |
| 5,812,865 A | 9/1998 | Theimer et al. | |
| 5,826,269 A | 10/1998 | Hussey | |
| 5,848,399 A | 12/1998 | Burke | |
| 5,873,056 A | 2/1999 | Liddy et al. | |
| 5,873,076 A | 2/1999 | Barr et al. | |
| 5,873,080 A | 2/1999 | Coden et al. | |
| 5,878,423 A | 3/1999 | Anderson et al. | |
| 5,884,302 A | 3/1999 | Ho | |
| 5,890,152 A | 3/1999 | Rapaport et al. | |
| 5,893,091 A | 4/1999 | Hunt et al. | |
| 5,897,622 A | 4/1999 | Blinn et al. | |
| 5,901,287 A | 5/1999 | Bull et al. | |
| 5,913,215 A | 6/1999 | Rubinstein et al. | |
| 5,933,822 A | 8/1999 | Braden-Harder et al. | |
| 5,948,054 A | 9/1999 | Nielsen | |
| 5,963,940 A | 10/1999 | Liddy et al. | |
| 5,966,695 A | 10/1999 | Melchione et al. | |
| 5,974,392 A | 10/1999 | Endo | |
| 5,974,412 A | 10/1999 | Hazlehurst et al. | |
| 5,987,454 A | 11/1999 | Hobbs | |
| 5,995,921 A | 11/1999 | Richards et al. | |
| 6,006,225 A | 12/1999 | Bowman et al. | |
| 6,016,476 A | 1/2000 | Maes et al. | |
| 6,021,403 A | 2/2000 | Horvitz et al. | |
| 6,026,388 A | 2/2000 | Liddy et al. | |
| 6,028,601 A | 2/2000 | Machiraju et al. | |
| 6,038,560 A | 3/2000 | Wical | |
| 6,052,710 A | 4/2000 | Saliba et al. | |
| 6,061,057 A | 5/2000 | Knowlton et al. | |
| 6,070,149 A | 5/2000 | Tavor et al. | |
| 6,076,088 A | 6/2000 | Paik et al. | |
| 6,078,914 A | 6/2000 | Redfern | |
| 6,094,652 A | 7/2000 | Faisal | |
| 6,151,600 A | 11/2000 | Dedrick | |
| 6,208,991 B1 | 3/2001 | French et al. | |
| 6,233,547 B1 | 5/2001 | Denber | |
| 6,260,035 B1 | 7/2001 | Horvitz et al. | |
| 6,278,996 B1 | 8/2001 | Richardson et al. | |
| 6,282,534 B1 | 8/2001 | Vora | |
| 6,285,998 B1 | 9/2001 | Black et al. | |
| 6,370,535 B1 | 4/2002 | Shapiro et al. | |
| 6,385,592 B1 | 5/2002 | Angles et al. | |
| 6,393,479 B1 | 5/2002 | Glommen et al. | |
| 6,401,084 B1 | 6/2002 | Ortega et al. | |
| 6,401,094 B1 | 6/2002 | Stemp et al. | |
| 6,405,190 B1 | 6/2002 | Conklin | |
| 6,466,899 B1 | 10/2002 | Yano et al. | |
| 6,471,521 B1 | 10/2002 | Dornbush et al. | |
| 6,477,551 B1 | 11/2002 | Johnson et al. | |
| 6,480,843 B2 | 11/2002 | Li | |
| 6,556,988 B2 | 4/2003 | Tsuchida et al. | |
| 6,564,213 B1 | 5/2003 | Ortega et al. | |
| 6,584,464 B1 | 6/2003 | Warthen | |
| 6,595,801 B1 | 7/2003 | Leonard et al. | |
| 6,675,159 B1 | 1/2004 | Lin et al. | |
| 6,766,320 B1 | 7/2004 | Wang et al. | |
| 6,907,414 B1 | 6/2005 | Parnell | |
| 6,928,425 B2 | 8/2005 | Grefenstette et al. | |
| 6,941,301 B2 | 9/2005 | Ferguson et al. | |
| 6,944,711 B2 | 9/2005 | Mogi et al. | |
| 6,957,213 B1 | 10/2005 | Yuret | |
| 7,024,400 B2 | 4/2006 | Tokuda et al. | |
| 7,035,864 B1 | 4/2006 | Ferrari et al. | |
| 7,035,910 B1 | 4/2006 | Dutta et al. | |
| 7,111,290 B1 | 9/2006 | Yates et al. | |
| 7,117,207 B1 | 10/2006 | Kerschberg et al. | |
| 7,136,845 B2 | 11/2006 | Chandrasekar et al. | |
| 7,149,732 B2 | 12/2006 | Wen et al. | |
| 7,177,795 B1 | 2/2007 | Chen et al. | |
| 7,181,731 B2 | 2/2007 | Pace et al. | |
| 7,209,921 B2 | 4/2007 | Pace et al. | |
| 7,234,140 B2 | 6/2007 | Dortmans | |
| 7,254,806 B1 | 8/2007 | Yates et al. | |
| 7,325,193 B2 | 1/2008 | Edd et al. | |
| 7,428,541 B2 | 9/2008 | Houle | |
| 7,617,184 B2 | 11/2009 | Ferrari et al. | |
| 7,668,850 B1 | 2/2010 | Bierner | |
| 7,672,951 B1 | 3/2010 | Bierner | |
| 7,676,517 B2 | 3/2010 | Hurst-Hiller et al. | |
| 7,747,601 B2 | 6/2010 | Cooper et al. | |
| 7,890,526 B1 | 2/2011 | Brewer et al. | |
| 7,921,099 B2 | 4/2011 | Bierner | |
| 8,082,264 B2 | 12/2011 | Bierner | |
| 8,296,284 B2 | 10/2012 | Bierner | |
| 8,478,780 B2 | 7/2013 | Cooper et al. | |
| 8,612,208 B2 | 12/2013 | Cooper et al. | |
| 8,781,813 B2 | 7/2014 | Cooper et al. | |
| 8,898,140 B2 | 11/2014 | Cooper et al. | |
| 8,924,410 B2 | 12/2014 | Bierner | |
| 2001/0014888 A1 | 8/2001 | Tsuchida et al. | |
| 2001/0047270 A1 | 11/2001 | Gusick et al. | |
| 2002/0023144 A1 | 2/2002 | Linyard et al. | |
| 2002/0049738 A1 | 4/2002 | Epstein | |
| 2002/0051020 A1 | 5/2002 | Ferrari et al. | |
| 2002/0078090 A1 | 6/2002 | Hwang et al. | |
| 2002/0103809 A1 | 8/2002 | Starzl et al. | |
| 2002/0152202 A1 | 10/2002 | Perro et al. | |
| 2002/0184255 A1 | 12/2002 | Edd et al. | |
| 2003/0014403 A1 | 1/2003 | Chandrasekar et al. | |
| 2003/0018512 A1 | 1/2003 | Dortmans | |
| 2003/0037073 A1 | 2/2003 | Tokudai et al. | |
| 2003/0051236 A1 | 3/2003 | Pace et al. | |
| 2003/0078958 A1 | 4/2003 | Pace et al. | |
| 2003/0101153 A1 | 5/2003 | Francis et al. | |
| 2003/0140316 A1 | 7/2003 | Lakritz | |
| 2003/0144994 A1 * | 7/2003 | Wen et al. | 707/3 |
| 2003/0204435 A1 | 10/2003 | McQuilkin et al. | |
| 2003/0217052 A1 | 11/2003 | Rubenczyk et al. | |
| 2003/0220815 A1 | 11/2003 | Chang et al. | |
| 2003/0233224 A1 | 12/2003 | Marchisio et al. | |
| 2004/0002887 A1 | 1/2004 | Fliess et al. | |
| 2004/0024739 A1 | 2/2004 | Copperman et al. | |
| 2004/0139067 A1 | 7/2004 | Houle | |
| 2004/0167870 A1 | 8/2004 | Wakefield et al. | |
| 2004/0254928 A1 | 12/2004 | Vronay et al. | |
| 2005/0080775 A1 | 4/2005 | Colledge et al. | |
| 2005/0120045 A1 | 6/2005 | Klawon | |
| 2005/0149496 A1 | 7/2005 | Mukherjee et al. | |
| 2005/0198563 A1 | 9/2005 | Kristjansson | |
| 2005/0203878 A1 | 9/2005 | Brill et al. | |
| 2005/0234969 A1 | 10/2005 | Mamou et al. | |
| 2005/0267871 A1 | 12/2005 | Marchisio et al. | |
| 2006/0059073 A1 | 3/2006 | Walzak | |
| 2006/0074836 A1 | 4/2006 | Gardner et al. | |
| 2006/0095326 A1 | 5/2006 | Sandhu et al. | |
| 2006/0106769 A1 | 5/2006 | Gibbs | |
| 2006/0122979 A1 | 6/2006 | Kapur et al. | |
| 2006/0136403 A1 | 6/2006 | Koo | |
| 2006/0173724 A1 | 8/2006 | Trefler et al. | |
| 2006/0179404 A1 | 8/2006 | Yolleck et al. | |
| 2006/0253427 A1 | 11/2006 | Wu et al. | |
| 2006/0259483 A1 | 11/2006 | Ozana | |
| 2006/0265232 A1 | 11/2006 | Katariya et al. | |
| 2007/0033116 A1 | 2/2007 | Murray | |
| 2007/0202475 A1 | 8/2007 | Habichler et al. | |
| 2007/0208738 A1 | 9/2007 | Morgan | |
| 2007/0282769 A1 | 12/2007 | Bierner | |
| 2008/0065617 A1 | 3/2008 | Burke et al. | |
| 2008/0104037 A1 | 5/2008 | Bierner | |
| 2008/0186683 A1 | 8/2008 | Ligtenberg et al. | |
| 2008/0189163 A1 | 8/2008 | Rosenberg et al. | |
| 2008/0215976 A1 | 9/2008 | Bierner et al. | |
| 2008/0235203 A1 * | 9/2008 | Case | G06F 17/30672 |

(56) References Cited

U.S. PATENT DOCUMENTS

| | | | |
|---|---|---|---|
| 2008/0243761 | A1 | 10/2008 | Guo et al. |
| 2008/0294651 | A1 | 11/2008 | Masuyama et al. |
| 2009/0077047 | A1 | 3/2009 | Cooper et al. |
| 2009/0083224 | A1 | 3/2009 | Dettinger et al. |
| 2009/0089044 | A1 | 4/2009 | Cooper et al. |
| 2010/0150764 | A1 | 6/2010 | Simonelli et al. |
| 2010/0205180 | A1 | 8/2010 | Cooper et al. |
| 2011/0075068 | A1 | 3/2011 | Mishima et al. |
| 2011/0105354 | A1 | 5/2011 | Glezer et al. |
| 2011/0131210 | A1 | 6/2011 | Bierner |
| 2011/0221676 | A1 | 9/2011 | Liu |
| 2012/0023459 | A1 | 1/2012 | Westerman |
| 2012/0030930 | A1 | 2/2012 | Theobald et al. |
| 2012/0049341 | A1 | 3/2012 | Bezama et al. |
| 2012/0057314 | A1 | 3/2012 | Li et al. |
| 2012/0118718 | A1 | 5/2012 | Geiger et al. |
| 2012/0131033 | A1 | 5/2012 | Bierner |
| 2012/0299839 | A1 | 11/2012 | Lu |
| 2013/0041921 | A1 | 2/2013 | Cooper et al. |
| 2013/0290342 | A1 | 10/2013 | Cooper et al. |
| 2014/0074826 | A1 | 3/2014 | Cooper et al. |

FOREIGN PATENT DOCUMENTS

| | | |
|---|---|---|
| EP | 2021989 | 2/2009 |
| EP | 2084619 | 8/2009 |
| EP | 2084619 | 7/2014 |
| WO | 0004465 | 1/2000 |
| WO | 0188662 | 11/2001 |
| WO | 0235376 | 5/2002 |
| WO | 2007134128 | 11/2007 |
| WO | 2008022150 | 2/2008 |
| WO | 2008067316 | 6/2008 |

OTHER PUBLICATIONS

L.L. Bean Home Page, L.L. Bean, Inc., http://web.archive.org/web/20000229132929/http://LLbean.com/, retrieved on Aug. 19, 2009, 2000, 1 page.

L.L. Bean Home Page, L.L. Bean, Inc., http://web.archive.org/web/20000229072041/http://llbean.com/, retrieved on Aug. 19, 2009, 2000, 1 page.

L.L. Bean Home Page, L.L. Bean, Inc., http://lweb.archive.org/web/20000229033021/http://llbean.com/, 2000, 1 page.

Baeza-Yates et al., Query Recommendation Using Query Logs in Search Engines, Current Trends in Database Technology—EDBT 2004 Workshops, Mar. 2004, pp. 588-596.

Chien et al., Semantic similarity between search engine queries using temporal correlation, In Proceedings of the 14th international conference on World Wide Web, Chiba, Japan. Session: Usage analysis, Retrieved from the Internet: <URL: http://www.ra.ethz.ch/CDstore/www2005/docs/p2.pdf>, May 10-14, 2005, pp. 2-11.

Clark, AnswerFriend Seeks to Sell Question-Answering Software, Wall Street Journal, Aug. 24, 2000.

Katz et al., Integrating Large Lexicons and Web Resources into a Natural Language Query System, To appear in Proceedings of the IEEE International Conference on Multimedia Computing and Systems, 1999, pp. 255-261.

Madhavan et al., Semantic Mappings for Data Mediation, retrieved from: pages.cs.wisc.edu/-anhai/talks/JayantMadhavan-Affiliates2002.ppt, Feb. 2002, pp. 1-17.

Raghavan et al., Crawling the Hidden Web. Computer Science Department, Stanford University, 2001, pp. 1-25.

Storey et al., The Role of User Profiles in Context-Aware Query Processing for the Semantic Web, Proceedings of the 9th International Conference on Applications of Natural Language to Information Systems, Jun. 2004, 13 pages.

Yuret, Discovery of Linguistic Relations Using Lexical Attraction, PhD Thesis, MIT, May 1998, pp. 1-56.

Yuret, Lexical Attraction Models of Language, Submitted to the Sixteenth National Conference on Artificial Intelligence, 1999, 7 pages.

Zaiane et al., Finding Similar Queries to Satisfy Searches Based on Query Traces, OOIS '02 Proceedings of the Workshops on Advances in Object-Oriented Information Systems, vol. 2426, 2002, pp. 207-216.

U.S. Appl. No. 10/820,341, Final Office Action mailed on Jan. 29, 2010, 21 pages.

U.S. Appl. No. 10/820,341, Final Office Action mailed on Dec. 19, 2008, 24 pages.

U.S. Appl. No. 10/820,341, Final Office Action mailed on Jun. 7, 2011, 25 pages.

U.S. Appl. No. 10/820,341, Non-Final Office Action mailed on Apr. 1, 2008, 12 pages.

U.S. Appl. No. 10/820,341, Non-Final Office Action mailed on Jun. 23, 2009, 19 pages.

U.S. Appl. No. 10/820,341, Non-Final Office Action mailed on Oct. 13, 2010, 26 pages.

U.S. Appl. No. 10/820,341, Notice of Allowance mailed on Aug. 12, 2013, 12 pages.

U.S. Appl. No. 10/820,341, Notice of Allowance mailed on Oct. 15, 2013, 2 pages.

U.S. Appl. No. 10/820,341, Non-Final Office Action mailed on Mar. 18, 2013, 32 pages.

U.S. Appl. No. 11/382,670, Final Office Action mailed on Jan. 26, 2009, 23 pages.

U.S. Appl. No. 11/382,670, Final Office Action mailed on Feb. 19, 2010, 28 pages.

U.S. Appl. No. 11/382,670, Notice of Allowance mailed on Oct. 14, 2010, 18 pages.

U.S. Appl. No. 11/382,670, Non-Final Office Action mailed on Jun. 12, 2008, 18 pages.

U.S. Appl. No. 11/382,670, Non-Final Office Action mailed on Jul. 16, 2009, 24 pages.

U.S. Appl. No. 11/383,169, Final Office Action mailed on Jan. 7, 2009, 23 pages.

U.S. Appl. No. 11/383,169, Notice of Allowance mailed on Jun. 5, 2009, 14 pages.

U.S. Appl. No. 11/383,169, Notice of Allowance mailed on Oct. 19, 2009, 16 pages.

U.S. Appl. No. 11/383,169, Non-Final Office Action mailed on Jul. 9, 2008, 21 pages.

U.S. Appl. No. 11/422,827, Final Office Action mailed on Jan. 7, 2009, 22 pages.

U.S. Appl. No. 11/422,827, Notice of Allowance mailed on Jul. 30, 2009, 17 pages.

U.S. Appl. No. 11/422,827, Notice of Allowance mailed on Oct. 16, 2009, 18 pages.

U.S. Appl. No. 11/422,827, Non-Final Office Action mailed on Apr. 24, 2008, 14 pages.

U.S. Appl. No. 11/464,443, Final Office Action mailed on Jan. 13, 2009, 20 pages.

U.S. Appl. No. 11/464,443, Notice of Allowance mailed on Feb. 12, 2010, 22 pages.

U.S. Appl. No. 11/464,443, Non Final Office Action mailed on Jun. 27, 2008, 12 pages.

U.S. Appl. No. 11/464,446, Advisory Action mailed on Feb. 24, 2012, 3 pages.

U.S. Appl. No. 11/464,446, Final Office Action mailed on Jan. 19, 2010, 40 pages.

U.S. Appl. No. 11/464,446, Final Office Action mailed on Dec. 20, 2011, 48 pages.

U.S. Appl. No. 11/464,446, Non Final Office Action mailed on Jul. 22, 2013, 48 pages.

U.S. Appl. No. 11/464,446, Non-Final Office Action mailed on Apr. 30, 2009, 24 pages.

U.S. Appl. No. 11/464,446, Non-Final Office Action mailed on Jul. 6, 2011, 47 pages.

U.S. Appl. No. 11/464,446, Notice of Allowance mailed on Mar. 12, 2014, 10 pages.

U.S. Appl. No. 11/464,446, Notice of Allowance mailed on Nov. 8, 2013, 13 pages.

U.S. Appl. No. 11/959,307, Final Office Action mailed on Nov. 22, 2010, 33 pages.

(56) References Cited

OTHER PUBLICATIONS

U.S. Appl. No. 11/959,307, Notice of Allowance mailed on Aug. 18, 2011, 16 pages.
U.S. Appl. No. 11/959,307, Non-Final Office Action mailed on Mar. 15, 2010, 30 pages.
U.S. Appl. No. 12/024,630, Advisory Action mailed on Mar. 21, 2012, 2 pages.
U.S. Appl. No. 12/024,630, Advisory Action mailed on Jul. 15, 2013, 4 pages.
U.S. Appl. No. 12/024,630, Final Office Action mailed on May 2, 2013, 19 pages.
U.S. Appl. No. 12/024,630, Final Office Action mailed on Oct. 1, 2014, 20 pages.
U.S. Appl. No. 12/024,630, Final Office Action mailed on Jan. 9, 2012, 19 pages.
U.S. Appl. No. 12/024,630, Non-Final Office Action mailed on Mar. 26, 2014, 18 pages.
U.S. Appl. No. 12/024,630, Non-Final Office Action mailed on Jun. 20, 2011, 18 pages.
U.S. Appl. No. 12/024,630, Non-Final Office Action mailed on Nov. 14, 2012, 21 pages.
U.S. Appl. No. 12/766,183, Advisory Action mailed on Dec. 19, 2012, 3 pages.
U.S. Appl. No. 12/766,183, Notice of Allowance mailed on Mar. 1, 2013, 6 pages.
U.S. Appl. No. 12/766,183, Non-Final Office Action mailed on Jan. 19, 2012, 22 pages.
U.S. Appl. No. 12/766,183, Final Office Action mailed on Oct. 1, 2012, 23 pages.
U.S. Appl. No. 12/766,183, Terminal Disclaimer mailed on Feb. 7, 2013, 2 pages.
U.S. Appl. No. 13/005,459, Advisory Action mailed on Mar. 2, 2012, 3 pages.
U.S. Appl. No. 13/005,459, Notice of Allowance mailed on Apr. 5, 2012, 12 pages.
U.S. Appl. No. 13/005,459, Notice of Allowance mailed on Jun. 22, 2012, 7 pages.
U.S. Appl. No. 13/005,459, Non-Final Office Action mailed on Apr. 13, 2011, 18 pages.
U.S. Appl. No. 13/005,459, Final Office Action mailed on Dec. 19, 2011, 21 pages.
U.S. Appl. No. 13/299,465, Advisory Action mailed on May 2, 2013, 3 pages.
U.S. Appl. No. 13/299,465, Final Office Action mailed on Jun. 5, 2014, 43 pages.
U.S. Appl. No. 13/299,465, Final Office Action mailed on Oct. 2, 2013, 44 pages.
U.S. Appl. No. 13/299,465, Non-Final Office Action mailed on Feb. 26, 2014, 43 pages.
U.S. Appl. No. 13/299,465, Non-Final Office Action mailed on Jun. 14, 2013, 41 pages.
U.S. Appl. No. 13/299,465, Notice of Allowance mailed on Aug. 21, 2014, 7 pages.
U.S. Appl. No. 13/299,465, Non-Final Office Action mailed on Aug. 16, 2012, 46 pages.
U.S. Appl. No. 13/299,465, Final Office Action mailed on Feb. 21, 2013, 45 pages.
U.S. Appl. No. 13/299,465, Terminal Disclaimer mailed on Apr. 22, 2013, 2 pages.
U.S. Appl. No. 13/929,157, Final Office Action mailed on Jun. 2, 2014, 12 pages.
U.S. Appl. No. 13/929,157, Non-Final Office action mailed on Dec. 18, 2013, 12 pages.
U.S. Appl. No. 13/929,157, Notice of Allowance mailed on Jul. 18, 2014, 7 pages.
International Application No. PCT/US2001/15711, International Preliminary Examination Report mailed on Feb. 16, 2005, 5 pages.
International Application No. PCT/US2001/15711, International Search Report mailed on Nov. 6, 2001.
International Application No. PCT/US2007/068597, International Preliminary Report on Patentability mailed on Nov. 11, 2008, 4 pages.
International Application No. PCT/US2007/068597, International Search Report mailed on Jul. 1, 2008.
International Application No. PCT/US2007/075929, International Preliminary Report on Patentability mailed on Feb. 17, 2009, 8 pages.
International Application No. PCT/US2007/075929, International Search Report mailed on Mar. 12, 2008.
International Application No. PCT/US2007/085646, International Preliminary Report on Patentability mailed on Jun. 3, 2009.
International Application No. PCT/US2007/085646, International Search Report mailed on Jul. 23, 2008.

* cited by examiner

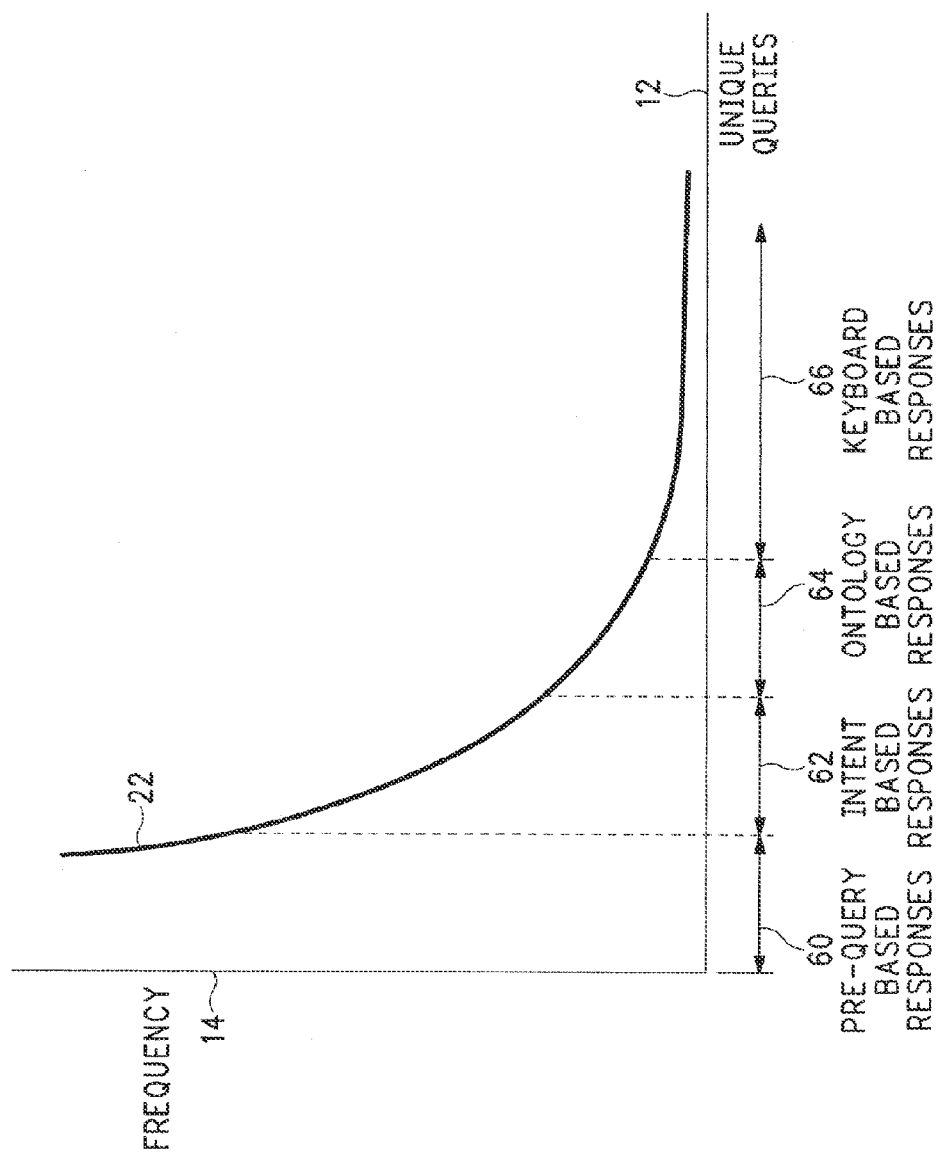

INTENT MANAGEMENT TOOL FOR IDENTIFYING CONCEPTS ASSOCIATED WITH A PLURALITY OF USERS' QUERIES

CROSS-REFERENCES TO RELATED APPLICATIONS

This application is a Continuation of U.S. application Ser. No. 11/464,446, filed Aug. 14, 2006, and entitled "INTENT MANAGEMENT TOOL FOR IDENTIFYING CONCEPTS ASSOCIATED WITH A PLURALITY OF USERS' QUERIES," which is incorporated by reference herein.

BACKGROUND OF THE INVENTION

Search engines try to provide the most relevant responses to user questions. Unfortunately, many search engines return information that may be unrelated, or not directly related, to the question. For example, search engines may return any document containing words matching keywords in the question. The user has to then manually sort through each returned document in an attempt to identify information that may be relevant or answer the question. This "brute force" method is time consuming and often fails to locate the precise information sought in the question.

Current search engines try to help the user in their manual document search by ranking the returned documents. This ranking method may rank documents simply according to the number of words in the documents that match keywords in the query. At least one critical limitation with this keyword search technique is that the user may not necessarily input search terms needed by the search engine to locate the correct information. In addition, even appropriate keywords may also be associated with other documents unrelated to the information sought by the user.

Search engines have been developed that attempt to classify queries. For example, the search engine may try to associate different words in the search query with different information categories. The search engine then attempts to provide the user with responses associated with the identified information category.

A critical problem with these information retrieval schemes is that there are seemingly limitless ways in a natural language for a user to request for the same information. And as also mentioned above, the user may not necessarily enter, or even know, the best words or phrases for identifying the appropriate information. Accordingly, the search engine can only classify a very limited number of subject matters. Further, a large amount of human resources are required to keep these types of search engines up to date with new information categories that may develop over time. Thus, these "higher level" search engines have had only limited success providing responses to user questions.

The present invention addresses this and other problems associated with the prior art.

BRIEF SUMMARY OF THE INVENTION

Linguistic analysis is used to identify queries that use different natural language formations to request similar information. Common intent categories are identified for the queries requesting similar information. Intent responses can then be provided that are associated with the identified intent categories. An intent management tool can be used for identifying new intent categories, identifying obsolete intent categories, or refining existing intent categories.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3A is a graph showing how the intent based search engine can provide different types of responses according to query frequency.

DETAILED DESCRIPTION OF THE INVENTION

Figure 1:
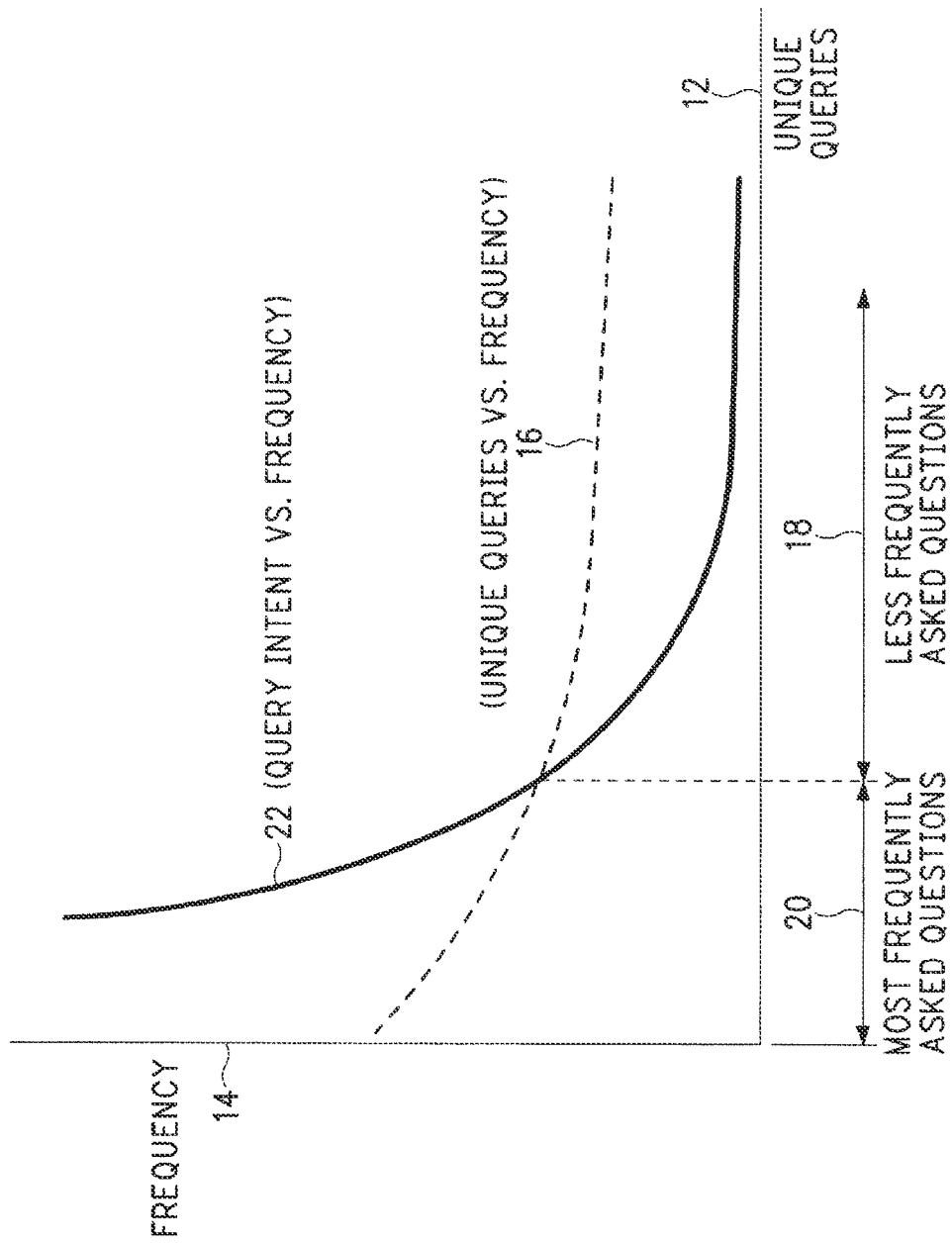
FIG. 1 is a graph that shows how the number of unique queries received by an enterprise can be reduced by classifying the queries into intent categories.

FIG. 1 is a graph showing the relationship between unique search queries and the frequency they are received by a particular enterprise. The enterprise could be any type of business or institution, such as a car dealer, financial service, telecommunications company, etc. that has a search engine that attempts to provide responses to questions submitted by users via computer terminals. The horizontal axis 12 refers to the different unique queries that may be received by one or more search engines operated by the enterprise. The vertical axis 14 refers to the frequency of the different unique queries.

A challenge exists trying to algorithmically decipher the meaning of received queries and then provide responses associated with the identified query meaning. For example, the shape of curve 16 indicates that a first portion 20 of the unique queries occur with the most frequency and a second portion 18 of the queries occur with slightly less frequency. As can be seen, a large percentage of the total number of queries occur in this second lower frequency portion 18.

Due to maintenance and resource issues, it may only be possible for search engines to try and determine the meaning and then provide associated responses for a subset of the most frequency received queries. For example, a search engine for an online book retailer may be designed to look for and identify queries related to book prices. However, it may not be cost and time effective to design the search engine to try and determine the meaning and provide associated responses for every possibly book question. For example, thousands of possible responses would have to be configured just to capture a relatively small percentage of possible book questions. This large number of preconfigured responses are difficult to maintain and would have to be constantly updated to respond to the never ending number of new questions related to new books.

Unfortunately and according to curve 16, developing a search engine that is only capable of responding to the most frequency asked questions 20, ignores a large percentage of queries 18 that may be received by the online book retailer. This substantial portion of "query outliers" 18 would then have to be processed using conventional keyword searches. The limitations of key word searching was previously explained above.

As a result, the search engine for the online book retailer may not provide the most relevant responses for a large percentage of the received queries. This could negatively effect business. In the online book seller example, some of the less frequently received queries 18 may relate to rare books that may have larger mark ups than the more recent/popular books associated with the most frequently received queries 20. Accordingly, these search engine limitations may cause the online book retailer to lose some high profit rare books sales.

An intent based search engine is used to determine the intent categories of queries and then provide corresponding responses for a larger proportion of unique queries that may be received by an enterprise. "Intent" refers to the meaning associated with a query. An intent based search engine classifies multiple different unique queries into common "useful" intent categories. The term "useful" refers to intent categories that are associated with relevant responses to information requests. For example, identifying an intent category for a group of queries associated with "the Internet", may be too broad to be useful to an enterprise that is attempting to respond to queries related to vehicle sales. However, identifying an intent category associated to "purchasing a vehicle over the Internet", may be very useful when responding to a user query.

Classifying queries according to their intent category changes the relationship between unique queries 12 and their frequency 14. This is represented by curve 22 where a significantly larger portion 20 of all received queries can be classified by a relatively small number of intent categories. Many of the outlier queries 18 previously located underneath curve 16 can be identified as having the same meaning or "intent" as some of the more frequently asked queries 20. Identifying the intent category for queries allow the search engine to provide more relevant responses to a larger percentage of queries while at the same time requiring substantially fewer resources to maintain the search engine. In other words, fewer responses can be used to adequately respond to a larger number of queries.

For example, a large number of queries received by a financial services enterprise may be related to 401K retirement plans. The queries related to 401 Ks may be expressed by users in many different ways. For instance, "what is the current value of my 401K", "how much money is in my company retirement account", "show me the status of my 401K investments", etc. The information sought for each of these queries can be classified by the same intent category, namely: Intent Category=value of 401K. By classifying queries into intent categories, fewer associated responses have to be maintained.

Figure 2:
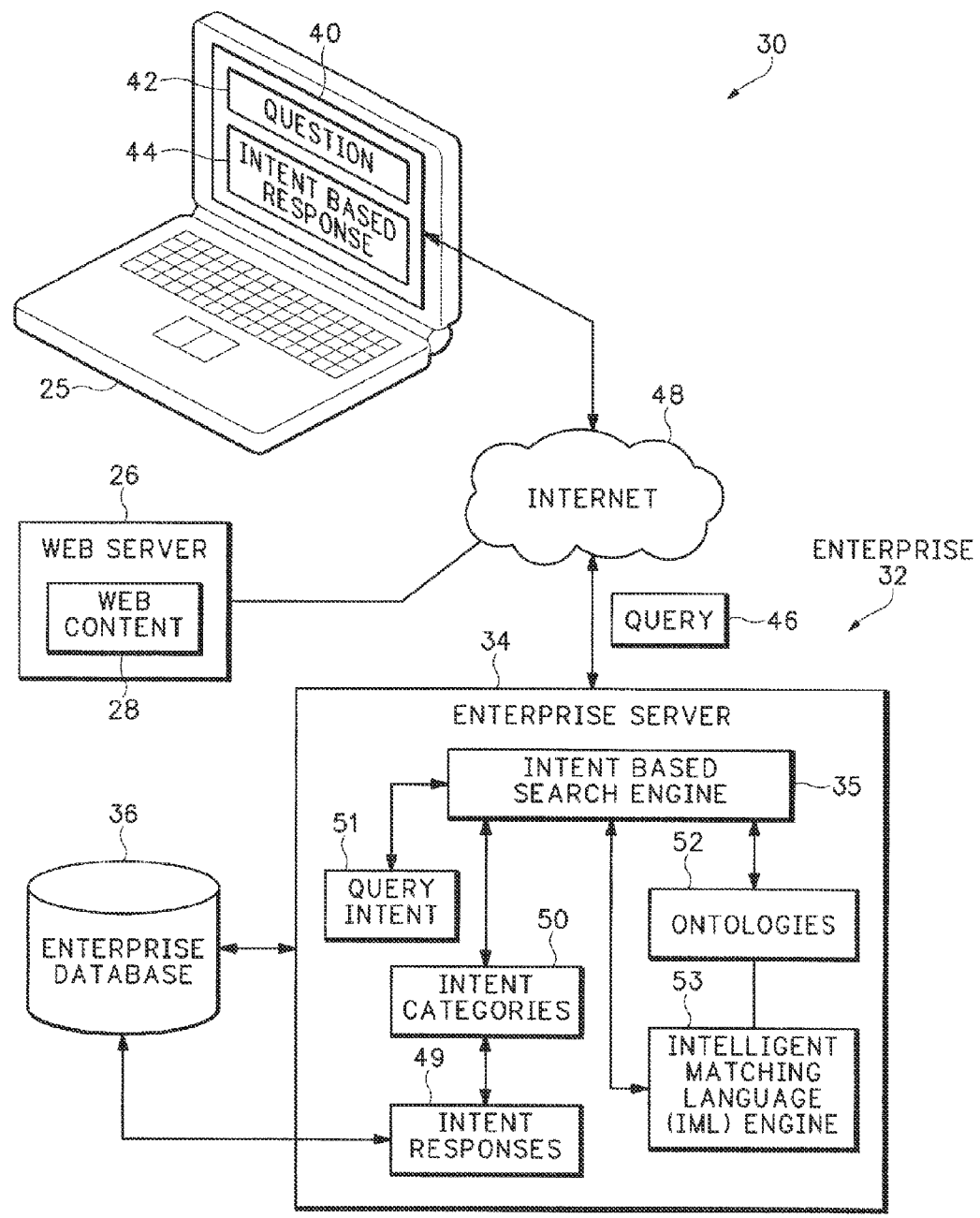
FIG. 2 is a block diagram showing an intent based search engine.

FIG. 2 shows a computer network system 30 that includes an enterprise 32 that has one or more enterprise servers 34 and one or more enterprise databases 36. As described above, the enterprise 32 may be an online retailer that sells books and other retail items. In this example, the enterprise database 36 may contain price lists and other information for all of the books and other merchandise available for purchase. In another example, the enterprise 32 may be associated with a car dealership or financial institution and the enterprise database 36 could include vehicle or financial information, respectively. These are, of course, just examples, and any type of business or entity can be represented as enterprise 32.

Other web servers 26 may operate outside of the enterprise 32 and may include associated files or other web content 28. Examples of content stored in enterprise database 36 and in web server 26 may include HyperText Markup Language (HTML) web pages, Portable Document Format (PDF) files, Word® documents, structured database information or any other type of electronic content that can contain essentially any type of information.

Information in database 36 may be stored in a structured preconfigured format specified for the enterprise 32. For example, a book or vehicle price list may be considered structured content. The enterprise 32 may also generate and store specific intent responses 49 either in enterprise database 36 or on enterprise server 34 that are associated with specific intent categories 50. Other information that is contained in enterprise database 36, or contained on other web servers 26, may be considered non-structured content. This may include HTML web pages, text documents, or any other type of free flowing text or data that is not organized in a preconfigured data format.

A query 46 (e.g., electronic text question) may be initiated by a user from a terminal 25 through a User Interface (UI) 40. The terminal 25 in one example may be a Personal Computer (PC), laptop computer, wireless Personal Digital Assistant (PDA), cellular telephone, or any other wired or wireless device that can access and display content over a packet switched network. In this example, the query 46 is initiated from the UI 40 and transported over the Internet 48 to the enterprise server 34. For example, query 46 may be a question sent to a bank asking: Query="what is the current interest rates for CDs".

The enterprise server 34 operates a novel intent based search engine 35 alternatively referred to as an automated response system. The search engine 35 provides electronic responses, answers, and/or content pursuant to electronically submitted queries 46. The intent based search engine 35 uses a set of predetermined intent categories 50, one or more ontologies 52, and an Intelligent Matching Language (IML) engine 53 to identify the intent category 51 for query 46 and then provide an associated intent response 49.

The intent analysis is described in more detail below and converts the relatively flat query vs. frequency relationship curve 16 previously shown in FIG. 1 into the steeper query intent vs. frequency relationship curve 22. This results in the intent based search engine 35 presenting a more relevant intent based response 44 for electronically submitted question 42 while at the same time requiring a relatively low number of intent responses 49 for responding to a large number of unique queries 46. Accordingly, fewer resources have to be maintained by the intent based search engine 35.

The search engine 35 receives queries 46 from the UI 40 resulting from a question 42 entered by a user. The search engine 35 attempts to match the meaning or "intent" of the query 46 with preconfigured intent categories 50 using an intelligent matching language engine 53 and ontologies 52. The intent based search engine 35 then identifies one of the intent based responses 49 associated with the identified query intent category 51. The intent responses 49 may be preconfigured content or network links to information responsive to associated intent categories 50. The intent responses 49 can also include any structured and/or non-structured content in the enterprise database 36 or on different web servers 26 that the intent based search engine 35 associates with the identified intent category 51. The identified information is then sent back to the UI 40 as intent based response 44.

The enterprise server 34 can include one or more processors that are configured to operate the intent based search engine 35. The operations performed by the intent based search engine 35 could be provided by software computer instructions that are stored in a computer readable medium, such as memory on server 34. The instructions are then executed by one or more of the processors in enterprise server 34. It should also be understood that the examples presented below are used for illustrative purposes only and the scope of the invention is not limited to any of the specific examples described below.

In one embodiment, the intent categories 50 are represented using a natural language, such as used in the IML engine 53. Using a natural language allows a system administrator to more easily create, delete, and modify intent categories 50. For example, the administrator can more easily identify which characteristics in an intent category need to be changed to more effectively classify a group of queries with a particular intent category. This is more intuitive than present information retrieval systems that use statistical analysis to classify queries into different categories.

Referring to FIGS. 2 and 3A, some of the different operations are described that may be performed by the intent based search engine 35. The search engine 35 may identify "a priori", the most frequently queried intent categories 50 (FIG. 2), and automatically display associated intent responses on the enterprise website. For example, 5-10% of the queries received by a financial service enterprise may contain questions related to retirement accounts. Accordingly, static links to web pages containing retirement account information may be presented on the home webpage for the financial institution prior to the user ever entering a question. This is referred to as pre-query based responses 60.

The intent based search engine 35 provides other types of responses according to the type of information that can be derived from the received queries. For example, there may be a set of around 100 intent categories 50 and corresponding intent responses 49 that address 60-70% of all unique queries received by a particular enterprise 32 (FIG. 2). A set of intent categories 50 are either manually or automatically derived based on previously received query information that cover this large percentage of unique queries. A set of intent responses 60 or 62 are then created that respond to the most frequently queried intent categories 50. The search engine 35 then attempts to match received queries with one of these frequent intent categories 50 and, if successful, sends back the corresponding intent based responses 60 or 62 (FIG. 3A).

Any identified intent categories 50 can also be used to improve the relevance of any other information provided in response to the query. For example, the identified intent category 50 in FIG. 2 may be used to identify both preconfigured intent based responses 49 and/or used for conducting an additional document search for other content in enterprise database 36 (FIG. 2) or other web content 28 in other web servers 26. The identified intent category 50 can also be used to extend or limit the scope of a document search or used to change the rankings for documents received back from the search.

The search engine 35 may use the IML engine 53 and ontologies 52 to discover concepts and other enterprise specific information contained in the queries 64. Any concepts discovered during query analysis can be used to discover the intent categories and associated intent based responses 62. However, the search engine 35 may not be able to identify an intent category 50 for some percentage of less frequently received queries. If no intent categories can be identified, the search engine 35 can still use any identified concepts to provide ontology based responses 64.

To explain further, the ontologies 52 shown in FIG. 2 may associate different words such as IRA, 401K, Roth, retirement, etc., with the broader concept of retirement accounts. The Intelligent Matching Language (IML) engine 53 is used in combination with the ontologies 52 to identify and associate these different phrases, words, and word forms, such as nouns, adjectives, verbs, singular, plural, etc., in the queries with different concepts.

For example, the IML engine 53 may receive a question asking about the price of a book but that does not necessarily include the symbol "$", or use the word "dollar". The IML engine 53 may use ontologies 52 to associate the symbol "$" and the word "dollar" with the words "Euro", "bucks", "cost", "price", "Yen", etc. The IML engine 53 then applies concepts such as <dollar> or <price> to the query 46 to then identify any words in the query associated with the <dollar> or <price> concepts. The identified concepts, words, etc., identified using IML engine 53 and ontology 52 are then used by the intent based search engine 35 to search for a relevant response.

One example operation of an IML engine 53 is described in co-pending patent application Ser. No. 10/820,341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY, which is herein incorporated by reference.

The intent based search engine 35 may also combine conventional keyword analysis with other intent and ontology based query analysis. If the search engine 35 does not identify any intent categories or ontology based concepts with the query, keyword based responses 66 may be provided based solely on keyword matching. For example, any content containing the same keywords used in the query 46 can be provided to the UI 40.

Thus, when no intent category can be determined, the search engine 35 may still use the domain based knowledge from the ontologies 52 to discover the most relevant responses 64. Alternatively, when the domain based knowledge does not provide any further understanding as to the meaning of the query, keyword analysis is used to provide keyword based responses 66. This is, of course, just one example of different combinations of intent, ontology concepts, and keyword analysis that can be performed on a query to provide different intent based responses 62, ontology based responses 64, and keyword based responses 66.

The intent based search engine 35 may conduct all of this intent, ontology and keyword analysis at the same time and then provide responses based on the highest level of query understanding. The intent based search engine 35 can use any other type of word, phrase, sentence, or other linguistic analysis, to determine the intent, concepts and words in the query. Similarly, any number of intent categories 50 and intent responses 49 may be used by the intent based search engine 35 and may cover any percentage of the unique queries 60, 62, 64, and 66 received by the enterprise server 34.

As described in more detail below, the intent based search engine 35 allows more efficient administration of an enterprise information system. For example, the most frequently referred to intent categories can be identified and associated intent responses derived. This provides a substantial advantage over existing search engine administration where little or no ability exists for classifying multiple different queries with the same associated response. Similarly, the administrator can more efficiently add, delete, update, and/or modify the most relevant intent categories. In other words, the administrator is less likely to waste time generating or maintaining responses for infrequently received or irrelevant queries. This again is described in more detail below.

Figure 3B:
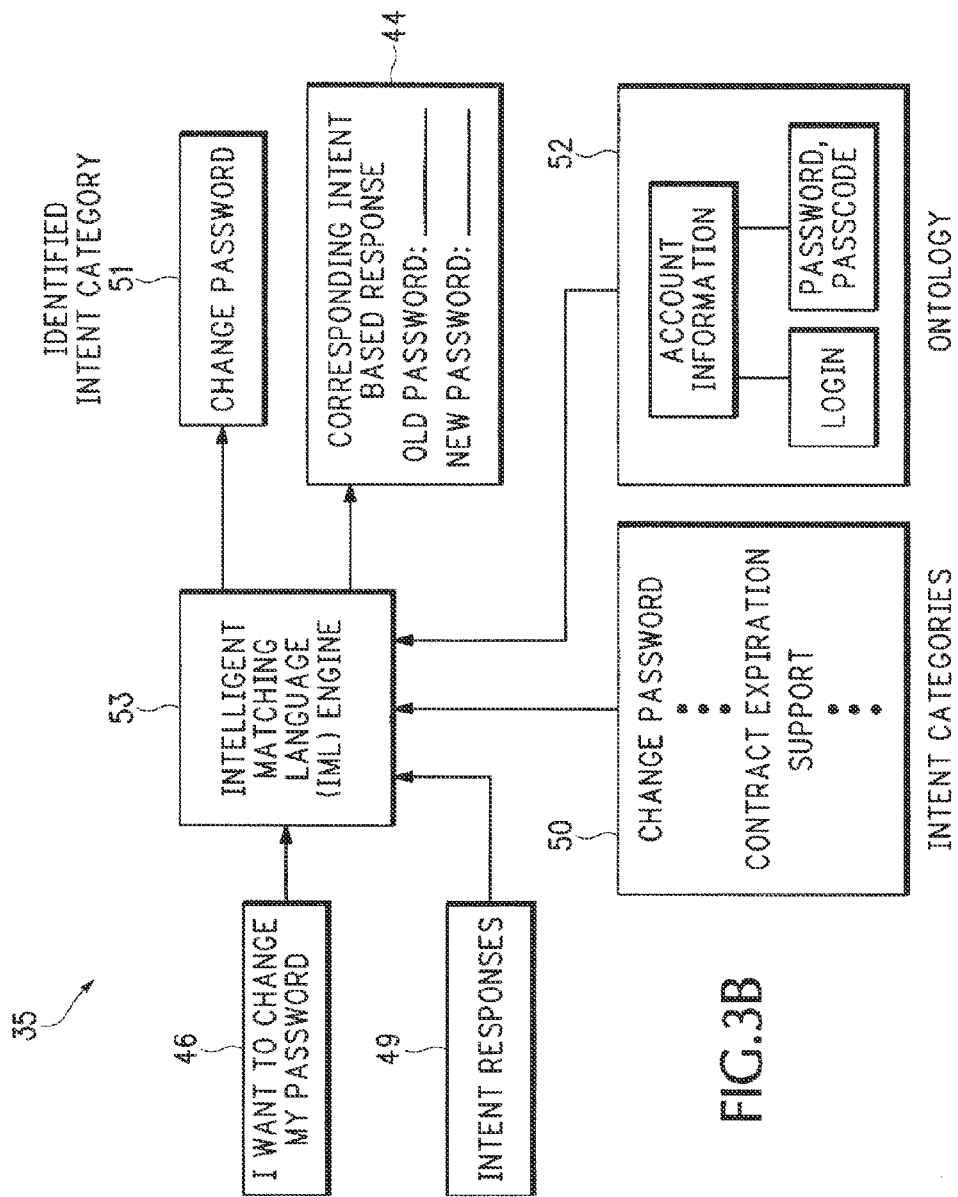
FIG. 3B is a block diagram showing the intent based query engine in more detail.

FIG. 3B shows in more detail how the search engine 35 identifies an intent category 51 for a query 46 and then provides an associated intent response 44. The query 46 received by the intent based search engine 35 is first analyzed by IML engine 53. The IML engine 53 uses natural language linguistic analysis to match the query 46 with one of the intent categories 50. One or more ontologies 52 are used that associated different words, phrases, etc., with different concepts that may be industry specific for the enterprise. For example, login, permission, password, passcode, etc., may all be associated with an <account information> concept that is regularly referred to by users accessing the enterprise network.

The IML 53 uses the ontologies 52, as well as other natural language associations, when trying to match the query 46 with one of the intent categories 50. When the query 46 is matched with one of the intent categories 50, the search engine 35 identifies the intent response 44 associated with the identified intent category 51. The identified intent response 44 is then displayed to the user.

For example, the following queries may either be received by the intent based search engine 35 in FIG. 2.

| Queries | Intent Category |
|---|---|
| How do I change my password? | |
| I want to change my password | |
| How do I update my pass word? | |
| Is there a form for modifying passcodes? | Change Password |
| Change my password | |
| Need to change my secret code | |
| Is there a password change form? | |

As seen above, each of these queries is associated with the same "change password" intent category 51. The search engine 35 may match each of these questions with the same intent category 51 and provide a corresponding intent response 44.

Intent Management Tool

Figure 4:
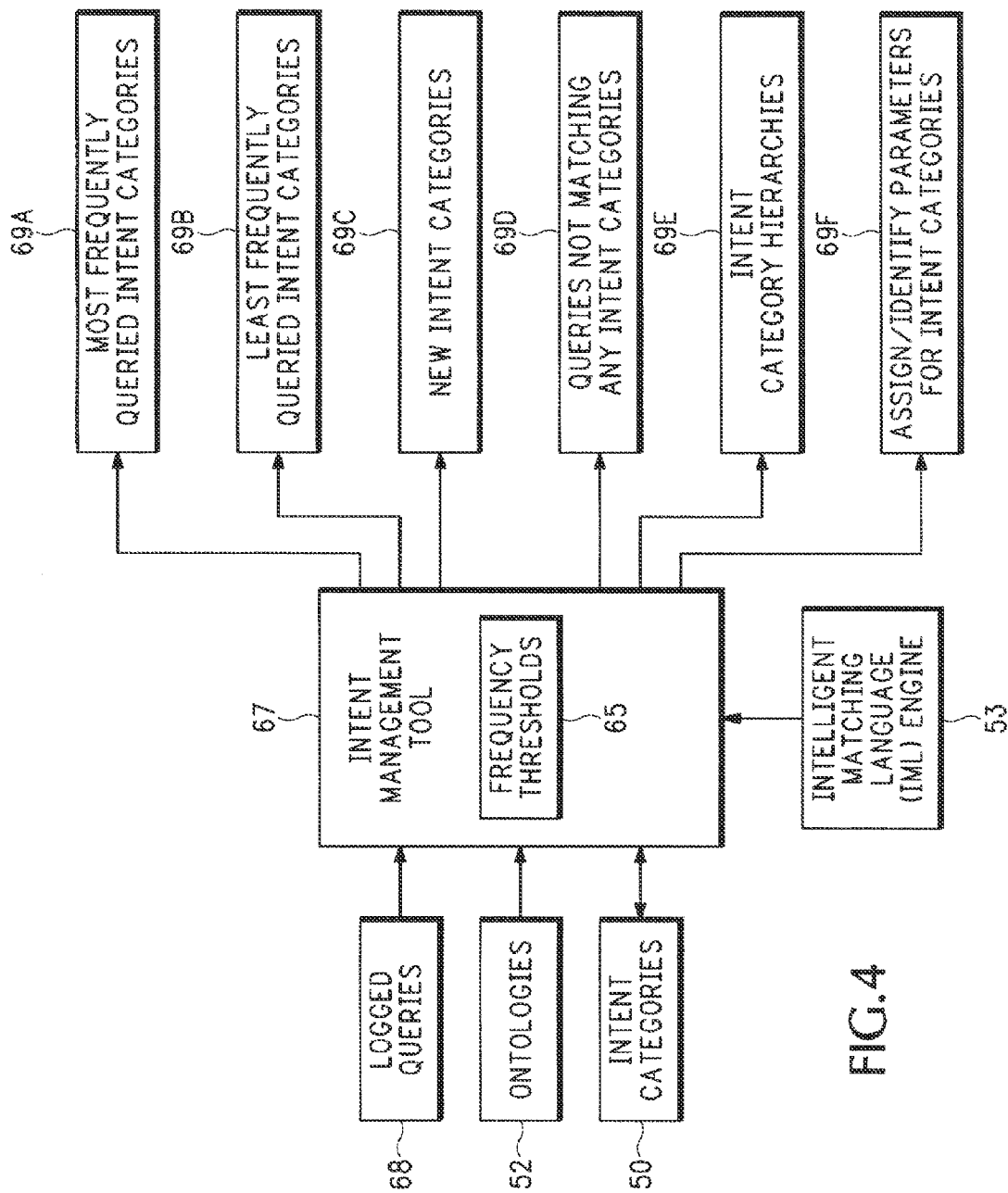
FIG. 4 is a block diagram showing how an intent management tool is used for managing intent categories.

FIG. 4 shows an intent management tool 67 that can be used to identify the most frequently queried intent categories 69A, identify the least frequently queried intent categories 69B, generate new intent categories 69C, identify queries 69D that do not match any existing intent categories, generate intent category hierarchies 69E, and/or assign and identify parameters to intent categories 69F.

The intent management tool 67 receives queries 68 that have been logged for some period of time by the enterprise server 34 (FIG. 2). The intent management tool 67 then uses existing intent categories 50, the intelligent matching language engine 53, and ontologies 52 to identify different information related to the logged queries 68 and the intent categories 50. For example, it may be beneficial to a website administrator to know which intent categories 69A match the most logged queries 68 or which intent categories 69B match the fewest logged queries 68. The intent management tool 67 can also automatically generate a new intent category 69C or identify queries 69D that do not match any existing intent categories. An intent category hierarchy 69E can be created that is used for providing alternative responses to received queries. Multiple different parameters 69F can also be identified and assigned to different intent categories and then used for associating the intent categories with different intent responses.

Figure 5A:
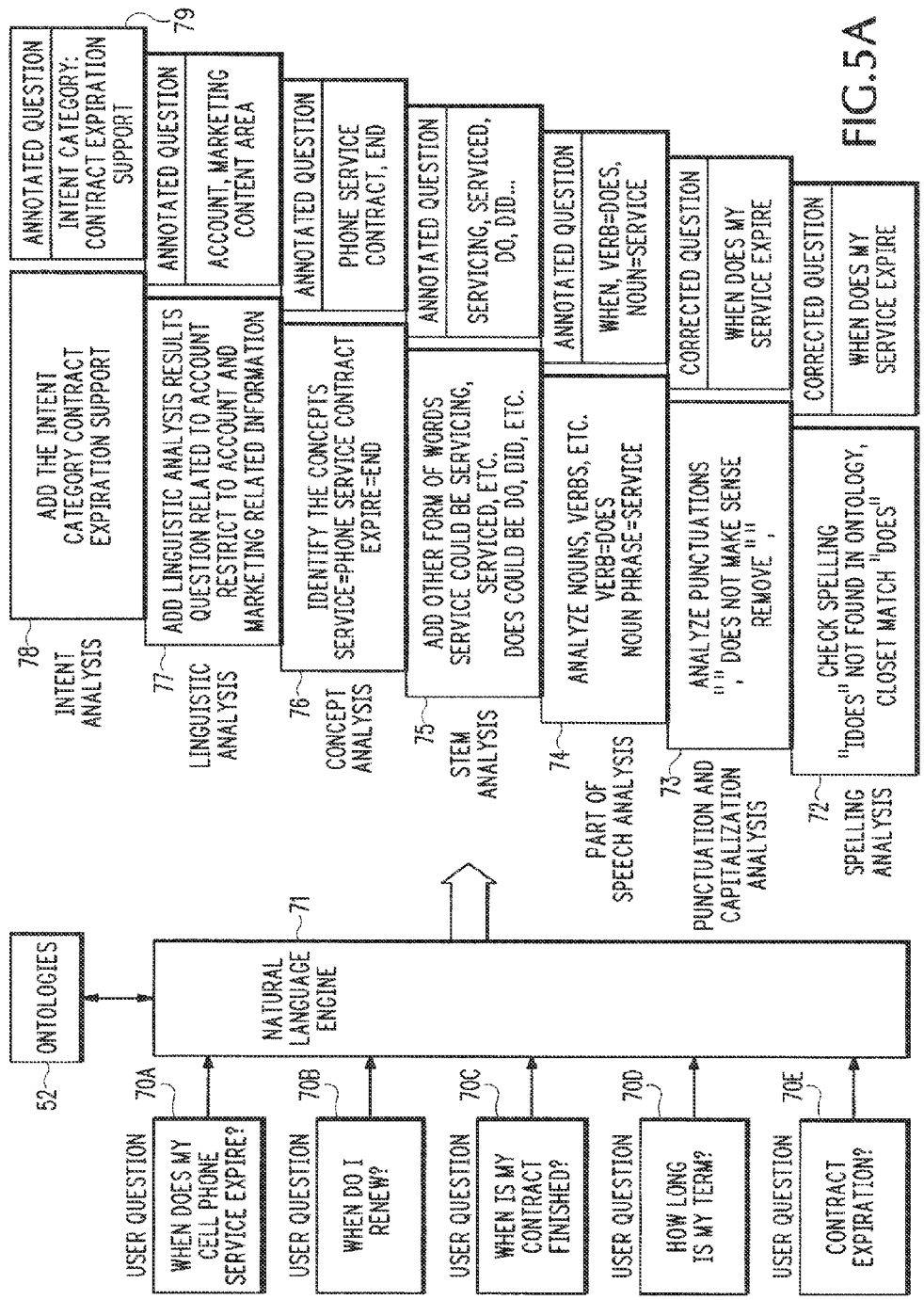
FIG. 5A is a block diagram showing how intent categories are automatically identified and derived from queries.

FIG. 5A shows one example of how the intent management tool 67 generates a new intent category 79, or how the intent based search engine 35 matches a query with an existing intent category 79. Multiple different queries 70 may be received or logged by the enterprise server 34 (FIG. 2). Some of these queries 70A-70E may be associated with a same existing or non-existing intent category: CONTRACT EXPIRATION SUPPORT. A first one of the queries 70A however contains the question: "when idoes, my service expire". In a first spelling analysis stage 72, a natural language engine 71 used either by the intent based search engine 35 (FIG. 2) or intent management tool 67 (FIG. 4) checks the spelling in query 70A. The term "idoes" is not found in any of the ontologies 52 (FIG. 2). Accordingly, "idoes" is replaced with the closest match "does".

In a next punctuation and capitalization stage 73, punctuation is analyzed and a comma is removed that does not make sense. A speech analysis stage 74 analyzes nouns, verbs, etc., in the corrected question to generate an annotated question. For example, the word "does" is identified as a verb and the word "service" is identified as a noun phrase. Other words in an identified noun phrase may be removed. In a stem analysis stage 75, the search engine 35 or management tool 67 may add other forms of the same identified words to the annotated question. For example, the identified noun "service" could also be associated with "servicing", "serviced", etc.

In a concept analysis stage 76, the management tool uses the ontologies 52 to identify any concepts associated with the annotated question. For example, the word "service" may be associated with the concept <phone service contract> and the word "expire" may associated with the concept <end>. A linguistic analysis stage 77 then adds linguistic analysis results. For example, the annotated question may be determined to be related to an account, and accordingly restricted to related account and marketing information. In an intent analysis stage 78, an existing intent category is identified that matches the annotated question or a new intent category 79 is created for the previously annotated question. Similar linguistic analysis of questions 70B-70E may result in identifying the same existing intent category 79 or may be used along with query 70A to create a new intent category 79.

Figure 5B:
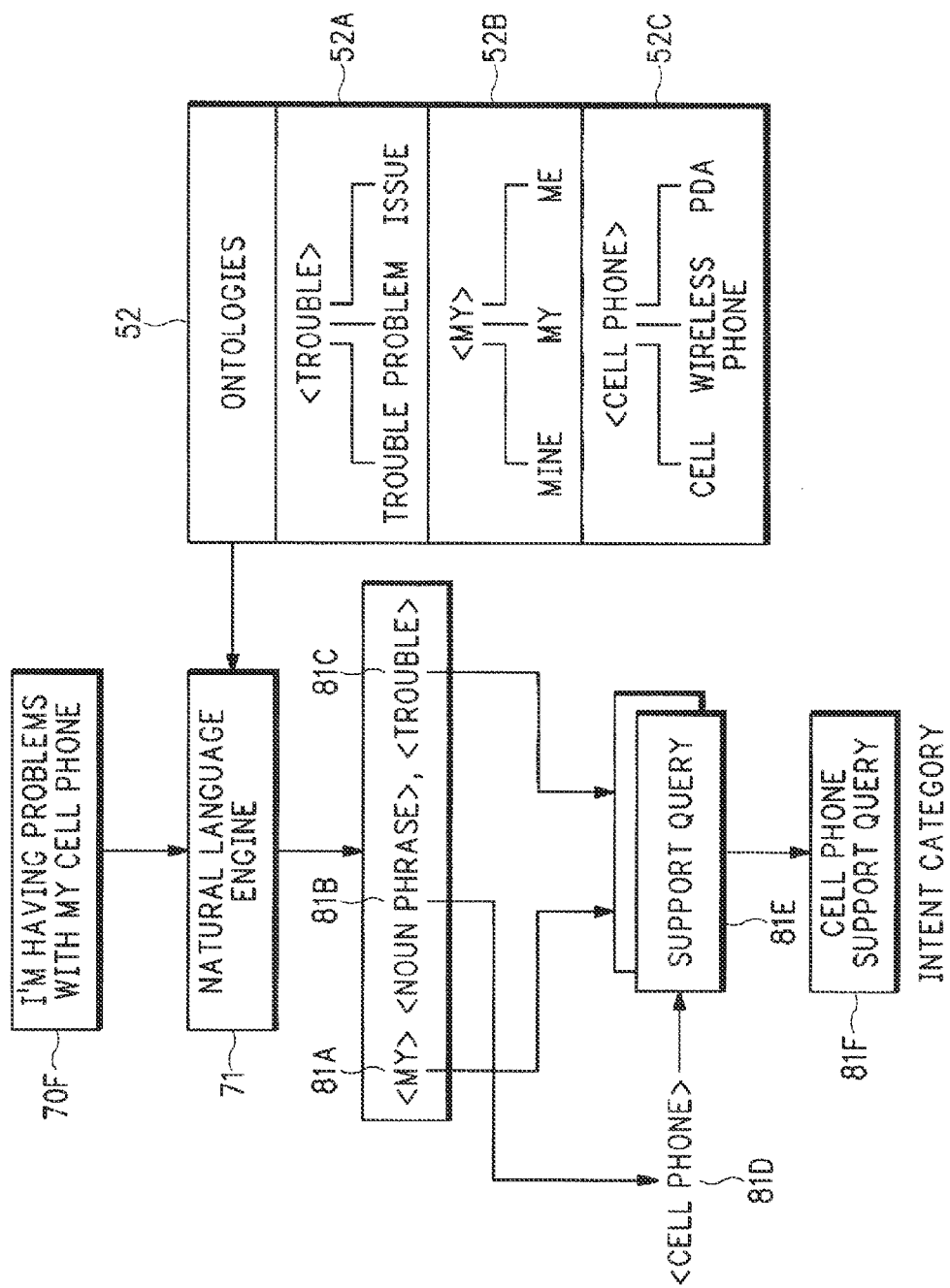
FIG. 5B shows in more detail how intent categories are automatically identified and derived from queries.

FIG. 5B describes in more detail how the intent categories are identified and created. A query 70F may ask the question: "I'm having trouble with my cell phone". The natural language engine 71 in combination one or more ontologies 52 are then used to conduct the concept analysis 76 and linguistic analysis 77 previously described in FIG. 5A. Different ontologies 52A-52C can be associated with different concepts. For example, ontology 52A is associated with the concept <trouble>, the ontology 52B is associated with pronouns and adjectives related to the concept <my>, and ontology 52C is associated with nouns and noun phrases related to the concept <cell phone>.

The natural language engine 71 uses ontologies 52 to identify different concepts 81A, 81B and 81C associated with the query 70F. The natural language engine 71 may identify a <my> concept 81A and a <trouble> concept 81C in query 70F. The natural language engine 71 may also identify the first <my> concept 81A as preceding a noun phrase 81B and also being located in the same sentence as the <trouble> concept 81C. This combination of concepts and associated sentence structure may be associated with a support query category 81E.

The support query category 81E may be associated with multiple different types of support intent categories and could even be identified as a parent intent category for multiple narrower support query intent categories in an intent category hierarchy. The natural language engine 71 uses the identified support query category 81E along with the <cell phone> concept 81D identified for the noun phrase 81B to identify a cell phone support query intent category 81F for query 70F.

One system that conducts the linguistic analysis described in FIGS. 5A and 5B is the Inquira Matching Language described in co-pending patent application Ser. No. 10/820, 341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY, which has already been incorporated by reference in its entirety. Of course, other types of natural language systems could also be used.

Figure 6:
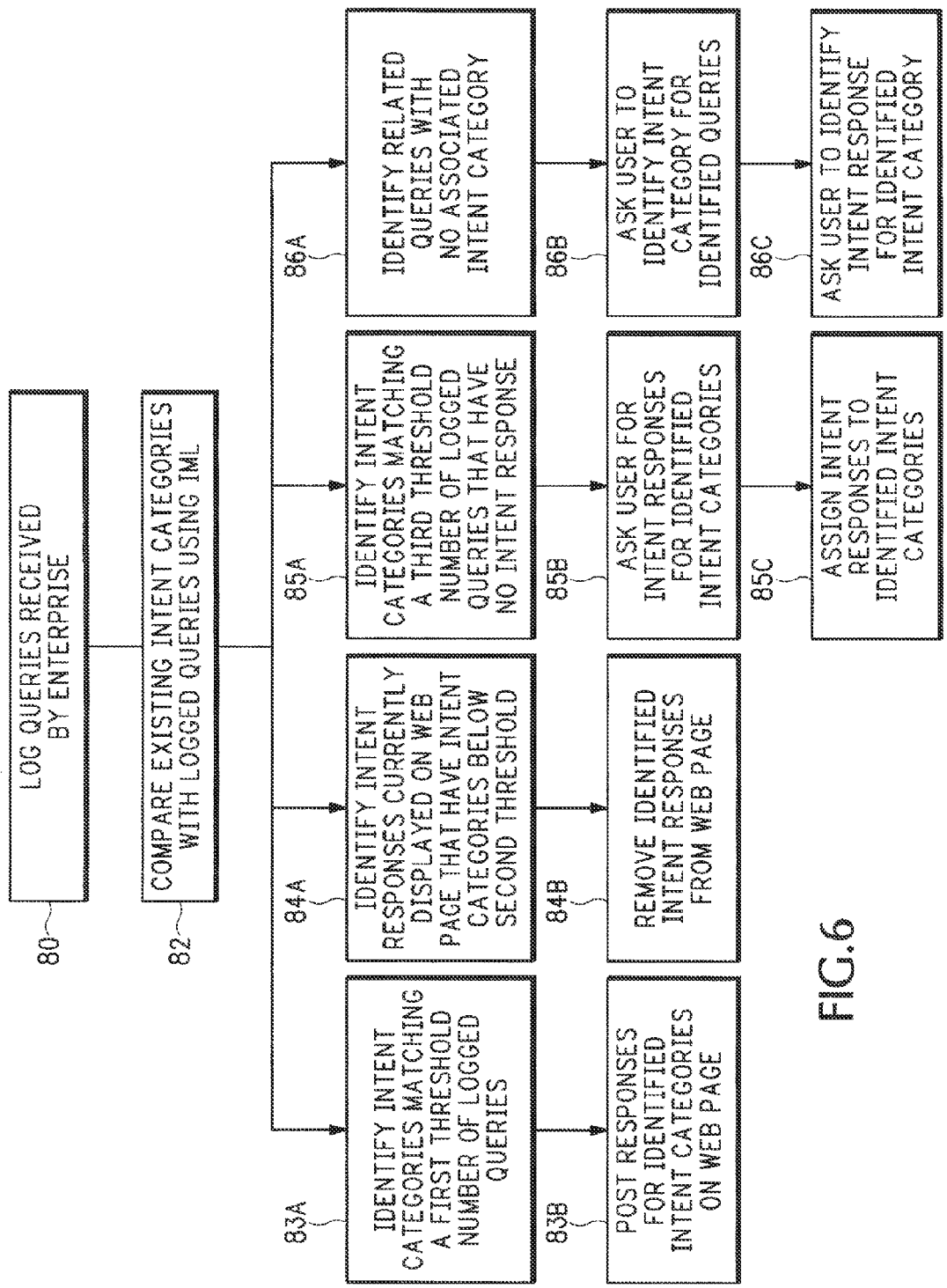
FIG. 6 is a flow diagram showing in more detail how the intent management tool in FIG. 4 manages intent categories.

FIG. 6 explains further how the intent management tool 67 in FIG. 4 can be used to update intent categories. In operation 80, previous queries are logged for some time period. For example, all of the queries for the past week. In operation 82, the intent management tool compares the logged queries with existing intent categories. Any intent categories matching more than a first threshold number of logged queries may be identified in operation 83A. Matching logged queries with existing intent categories can be performed in a similar manner as described above in FIGS. 5A and 5B. The intent responses for any identified intent categories in operation 83A may then be posted on an enterprise webpage in operation 83B. For example, 20% of the logged queries may have been associated with "contract expiration support" questions. If the threshold for adding an intent response to the enterprise web page is 15%, then a link to information relating to "contract expiration support" may be posted on the enterprise home web page in operation 83B.

Optionally, the intent management tool may in operation 84A identify information currently displayed or listed on the enterprise webpage that have an associated intent category that does not match a second threshold number of logged queries. Information associated with intent categories below this second threshold may be removed from the enterprise webpage in operation 84B. For example, the enterprise home web page may currently display a link to an interest free checking promotion. If the number of logged queries matching an "interest free checking" intent category are below the second lower threshold, such below 1% of all logged queries, the "interest free checking" link or information can be identified by the intent management tool 67 and then either manually or automatically removed from the enterprise web page.

This provides a valuable system for promoting different services or products to users. For example, as described above, the intent management tool 67 can be used to determine that the "interest free checking" promotion is of little interest to customers. Alternatively, the same intent management tool 67 can determine that a "home refinance" promotion associated with a "home refinance" intent category has a substantially larger number of matching queries. Accordingly, a website administrator can quickly replace the interest free checking promotion with the home refinance promotion on the enterprise home web page.

In operation 85A, the software executing the intent management tool 67 may automatically identify frequently queried intent categories that have no associated intent response. For example, the intent management tool 67 may identify intent categories with no currently associated intent response that match a third threshold number of logged queries. In operation 85B, the intent management tool 67 asks the administrator to identify an intent response for any identified intent categories. The intent responses can be information such as a web page and/or links to information on a web page that is responsive to the identified intent category. The intent responses input by the administrator are then assigned to the associated intent categories by the intent management tool 67 in operation 85C.

In yet another operation 86A, the software operating the intent management tool 67 may identify related queries with no associated intent categories. For example, a group of queries may be identified that are all related with a same financial service promotion but that currently have no assigned intent category. The largest number of related queries with no associated intent category may be identified first, and then lower numbers of related queries listed, etc. Alternatively, the intent management tool 67 can be configured to only list related queries over some predetermined threshold number.

The intent management tool in operation 86B asks the administrator to identify an intent category for the group of identified queries. Alternatively, the common information identified in the group of queries may be used as the intent category. In operation 86C, the intent management tool 67 then asks the user to identify an intent response for the identified intent category.

Figure 7:
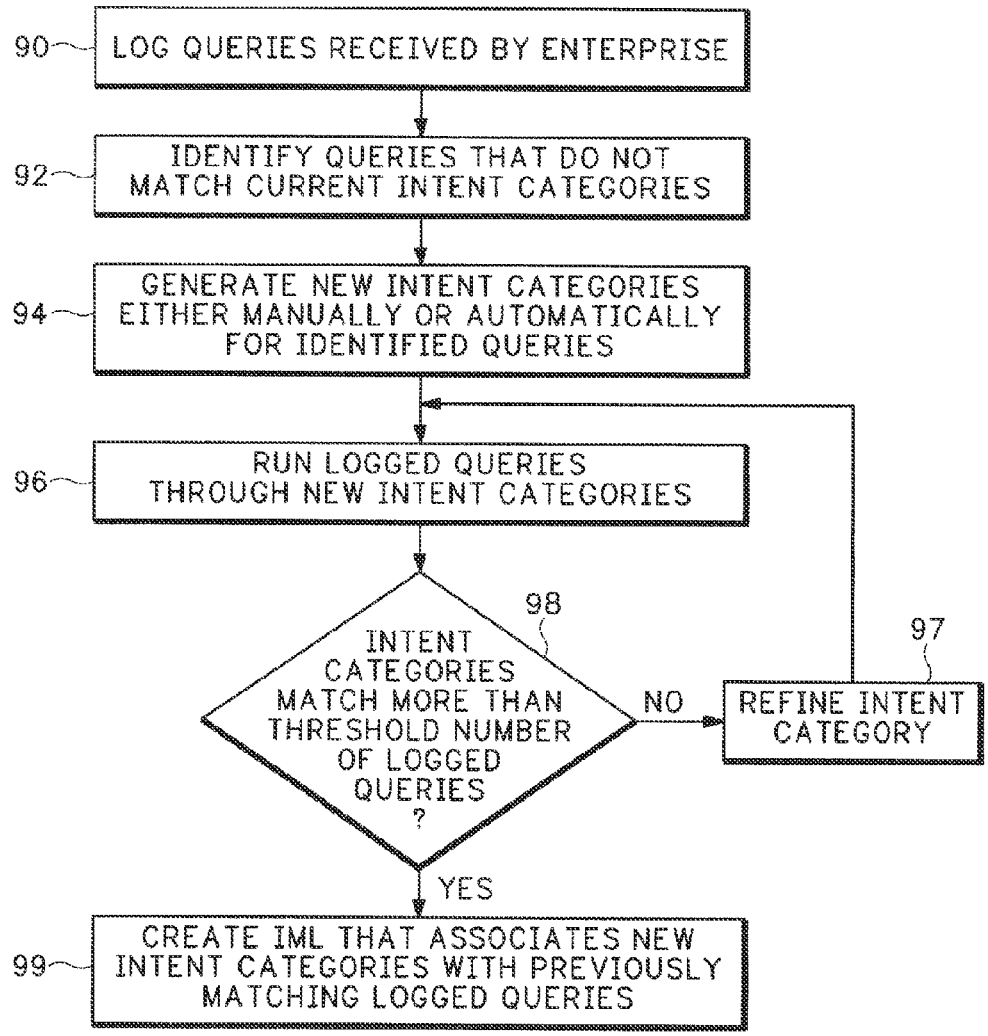
FIG. 7 is a flow diagram showing how new intent categories can be generated and refined using the intent management tool.

FIG. 7 shows one way the intent management tool 67 can be used to update existing intent categories. In operation 90, queries are logged for some period of time in the same manner described above in FIG. 6. In operation 92, the intent management tool 67 identifies logged queries that do not match any current intent categories. One or more new intent categories are then created for the non-matching queries in operation 94. The new intent categories are either manually generated by the administrator or automatically generated by a natural language engine 71 as described above in FIGS. 5A and 5B.

The new intent categories are then run against the logged queries in operation 96. This operation may be iterative. For example, the number of matching queries is identified in operation 98. If the number of queries matching the new intent category is below some threshold, such as a predetermined percentage of the logged queries, the new intent category may be refined in operation 97 and then compared again with the logged queries in operation 96. For example, the administrator may modify certain words in the intent category that may cause more matches with the logged queries. When the new intent category matches more than some threshold number of logged queries in operation 98, IML is created in operation 99 that automatically matches the same logged queries with the new intent category.

In another embodiment, the new intent category may also be applied to other query logs to verify accuracy. For example, a query log from another time period may be applied to the newly created intent category. The operation described above for generating new intent categories can also be used when generating the initial intent categories for an enterprise.

It should also be understood that an industry expert may be used to review the logged queries and then manually generate useful intent categories based on the results from the intent management tool 67. The fact that the intent categories are "useful" is worth noting. Some clustering algorithms may generate information categories that, for example, may be too broad to really provide useful information. For example, as described above, a clustering algorithm may identify queries all related to "email". However, providing and supporting a general email intent category may be of little relevance when trying to provide responses to queries directed to an online financial institution.

The industry expert can first derive pertinent intent categories and then refine the derived intent categories to optimize the number of queries matches. This ensures that intent categories are useful and are relevant to the actual queries submitted by users. The optimized intent categories are then used by the search engine to identify query meaning. Alternatively, all or part of the intent category generation can be automated using the intent discovery tool 67 as described above in FIGS. 5A and 5B and as described in further detail below.

The intent discovery tool 67 also allows the web site administrator to identify queries that do not correspond with current intent categories. For example, users may start using new terminology in queries referring to a new service or product. The intent discovery tool 67 can identify these queries that do not match existing intent categories and then either modify an existing related intent category or create a new intent category that matches the identified queries.

Intent Hierarchy

Figure 8:
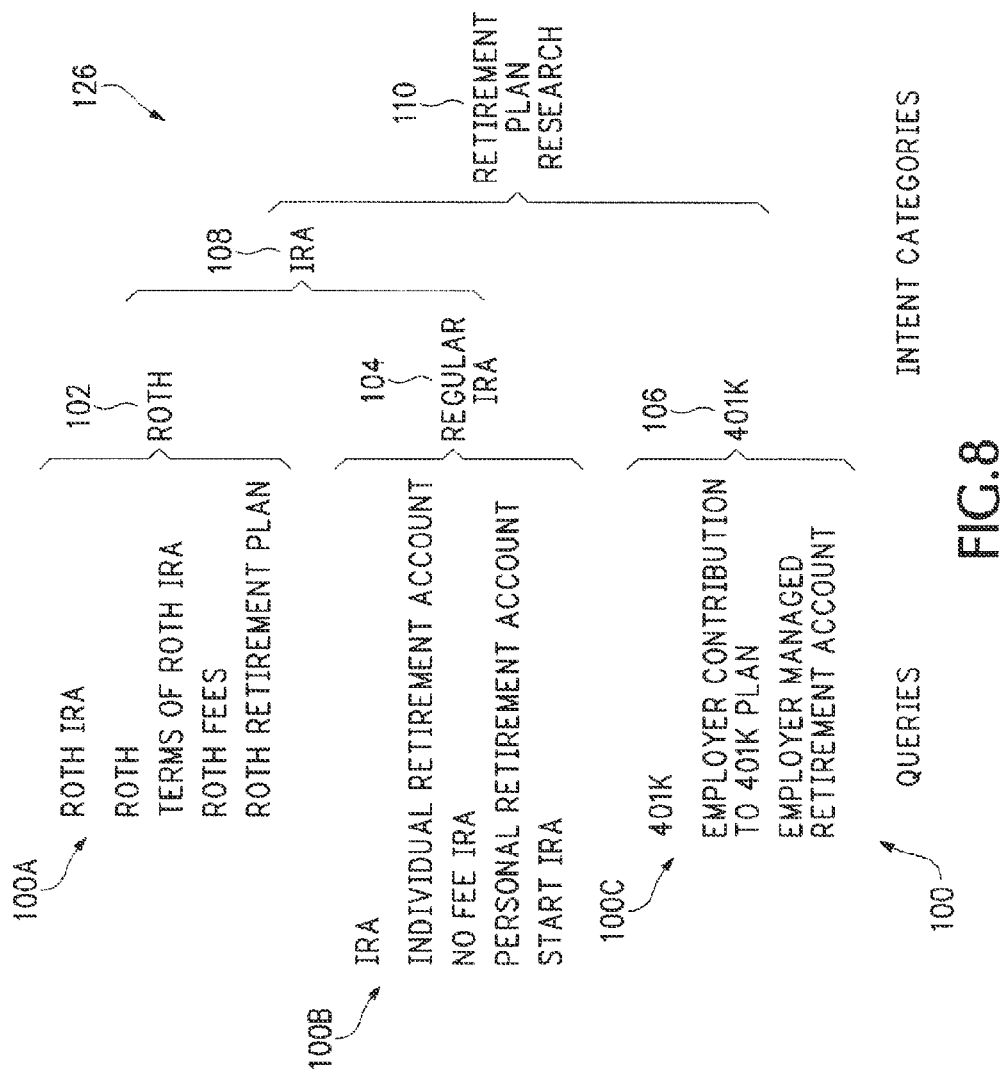
FIG. 8 shows how intent categories can be associated with an intent hierarchy.

FIG. 8 shows how hierarchies can be associated with intent categories. In this example, a group of queries 100 are all associated with a retirement plan research intent category 110. Either manually or through the intent management tool 67 in FIG. 4, a Roth intent category 102 is derived for a first group of queries 100A, a Regular IRA intent category 104 is created for a second group of queries 100B, and a 401K intent category is derived for a third set of queries 100C.

Again either manually by an industry expert, or automatically with the management tool 67, an intent hierarchy 126 is derived for the intent categories 102-110. For example, a parent "IRA" intent category 108 is derived for intent categories 102 and 104. In addition, a parent "Retirement Plan Research" intent category 110 is derived for intent categories 108 and 106.

This intent hierarchy 126 can be derived in a variety of different ways, but in one example could use clustering analysis as described in more detail below in FIG. 15. A hierarchy tag can then be assigned to the intent categories to control what responses are automatically presented to a user.

Figure 9:
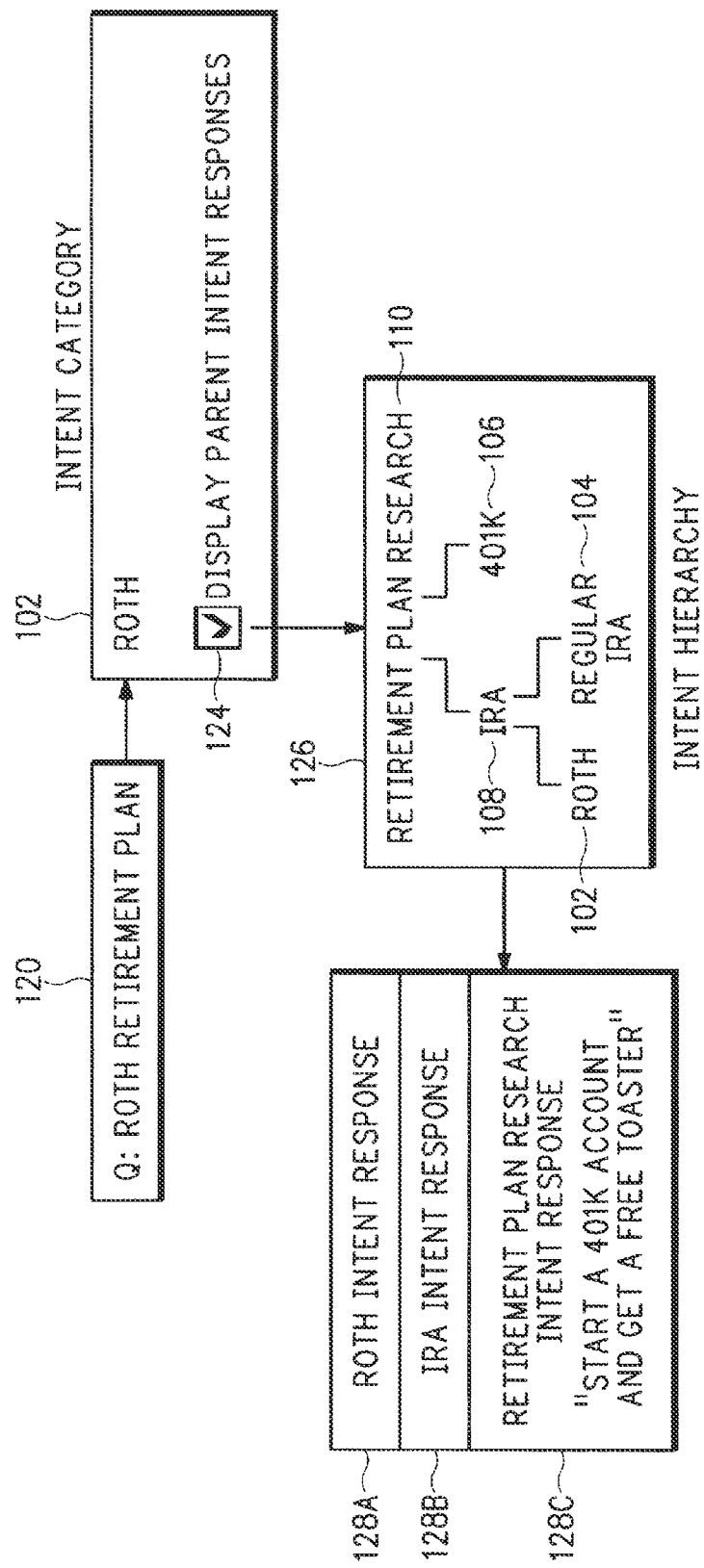
FIG. 9 is a block diagram showing how different intent responses are displayed according to an associated intent hierarchy.

To explain further, FIG. 9 shows how the intent hierarchy 126 is used in combination with an identified intent category 102. The intent based search engine may receive a query 120 that matches the Roth intent category 102 previously described in FIG. 8. Accordingly, the search engine displays an intent response 128A associated with the identified "Roth" intent category 102.

However, the intent category 102 can also be assigned a tag 124 that directs the search engine to display responses for any parents of the "Roth" intent category 102. Accordingly, by selecting tag 124, the search engine refers to the intent category hierarchy 126 to identify any parents of "Roth" intent category 102. In this example, the "IRA" intent category 108 and the "Retirement Plan Research" intent category 110 are identified as parents. Accordingly, intent responses 128B and 128C associated with intent categories 108 and 110, respectively, are also displayed in response to query 120.

Notice that in this example, the intent response 128C associated with parent intent category 110 includes a promotional advertisement for opening a 401K account. Since the "Roth" intent category 102 and the "401K" intent category 106 both have a common parent 110, the enterprise can use tag 124 to promote services, products, or present other information to users that is related to a common broader subject matter than what is actually contained in query 120.

This intent hierarchy feature provides a powerful tool for providing relevant information responsive to a query. For example, a user may not necessarily know they are seeking information related to a 401K account. However, the user is aware of IRA accounts. Intent hierarchy tag 124 allows the search engine to automatically associate a question related to IRAs with an intent category related to 401K accounts based on the classification of both IRA and 401K accounts under the same "Retirement Plan research" parent intent category 110. Thus, the user may receive some relevant 401K information under the "Retirement Plan research" intent category 110 without ever using the word "401K" in the query 120. This also has promotional and advertising advantages. For example, the enterprise can notify any user sending any type of retirement plan related query of a new 401K promotion.

The intent hierarchy tag 124 can consist of a pointer to an associated intent hierarchy 126 as shown in FIG. 9. The intent hierarchy tag 124 can also be used to direct the search engine to display intent responses associated with child intent categories or associated with other intent categories not contained in the same hierarchy.

Parameterized Intent Categories

Figure 10:
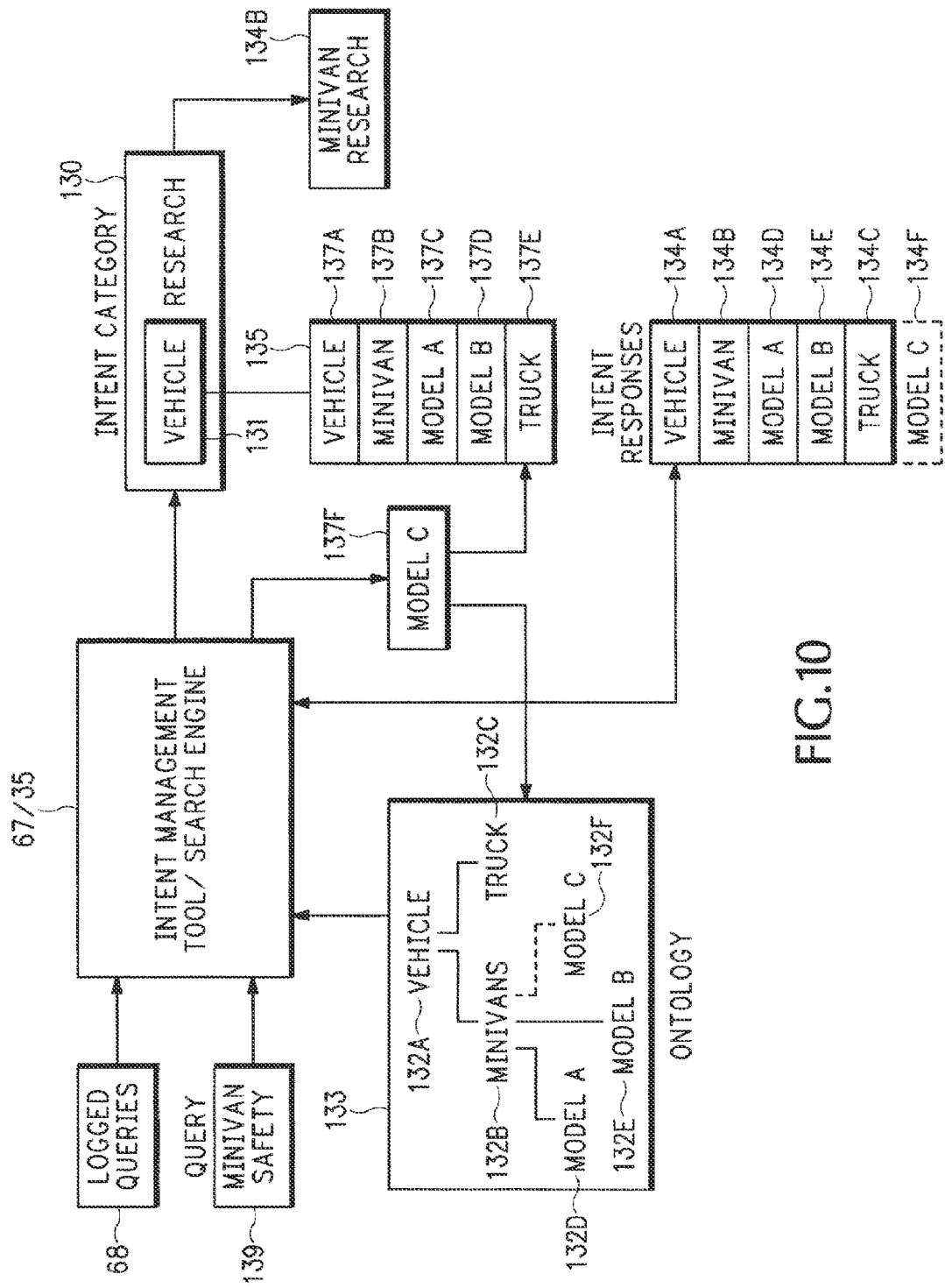
FIG. 10 is a block diagram showing how a user or administrator can associate different parameters with an intent category.

FIG. 10 shows another embodiment of the intent based search engine 35 that allows an administrator or user to associate different parameters with intent categories. The intent management tool 67, for example, may process logged queries 68. In this example, the intent management tool 67 either identifies or creates a "vehicle research" intent category 130 and may then assign different intent responses 134 to the intent category 130 using parameters 135.

The management tool 67 automatically compares the intent category 130 with one or more ontologies 133 and determines that the word "vehicle" 131 in the intent category 130 is associated with the <vehicle> concept 132A in ontology 133. The management tool 67 may then present the user with a drop down menu or, some other type of display, that shows the different concepts or other words or phrases associated with the <vehicle> concept 132A in ontology 133. In this example, the concepts 132A-132E in ontology 133 are displayed as parameters 137A-137E, respectively. The parameters 137A-137E may include pointers to associated intent responses 134A-134E, respectively.

The administrator can select which of the parameters 137A-137E (pointers to intent responses 134) to associate with the intent category 130. In this example, the administrator at least selects minivan parameter 137B. The search engine 35 will then use the assigned parameter 137B to provide additional responses to an associated query. For example, the search engine 35 may later receive a query 139 associated with the vehicle research intent category 130. The search engine 35 identifies the selected parameter 137B assigned to intent category 130 and accordingly displays the intent responses 134B.

In another embodiment, the intent parameters 135 may also cause the search engine to display responses for any associated parent concepts. For example, a query may be associated with a minivan research intent category. A parameter 135 can be assigned to the minivan intent category that causes the search engine to provide responses associated with any of the broader concepts in ontology 133, such as a response related to the vehicle research intent category 130.

The selection of different parameters 135 can similarly be performed by a user. For example, the search engine 35 may initially display the intent category 130 to the user based on a received query. The user can then be provided with the same list of different parameters 137A-137E associated with the ontology 133. The user then selects which intent responses 134 to display by selecting any combination of parameters 137A-137D.

It is worth noting that the intent category hierarchy described above in FIGS. 8 and 9 and the intent parameters shown in FIG. 10 may be useful in classifying different types of queries. For example, the intent hierarchies in FIGS. 8 and 9 may be better at classifying queries that include more verbs, and the intent parameters in FIG. 10 may be better at classifying queries that include more nouns. For example, questions related to specific types of products may include more nouns while questions related to services or user activities may include more verbs. Of course, these are just examples and either the intent category hierarchy or the intent parameters can be used for any type of query.

Generating New Intent Parameters

Referring still to FIG. 10, the intent management tool 67 can also be used for identifying new intent parameters 140. The intent management tool 67 may identify a large group of queries all matching intent category 130 but that do not match any of the existing parameters 135 or associated concepts 132 in ontology 133. For example, a group of queries may all be associated with a new minivan model C that is not currently identified in ontology 133.

The intent management tool 67 suggests adding a new parameter 137F to parameter list 135 that is associated with the identified minivan model C. Upon selection, parameter 137F is add to parameter list 135. The intent management tool 67 may also ask the administrator to add any other synonyms associated with the new model. C parameter 137F and provide an associated intent response 134F. In addition, the intent management tool 67 may update ontology 133 to include a new model C concept 132F underneath the minivan concept 132B.

User Classification

The intent management tool 67 can also assign different "user" related parameters to intent categories. This allows the intent based search engine to associate particular intent responses or search engine actions with different types of users. For example, it may be desirable to automatically initiate a phone call to any long term user that has sent a query associated with terminating an existing account. In another scenario, it may be desirable for the search engine to track the number of times particular users send queries associated with particular intent categories. The search engine can then send intent responses based on the tracked frequency.

Figure 11:
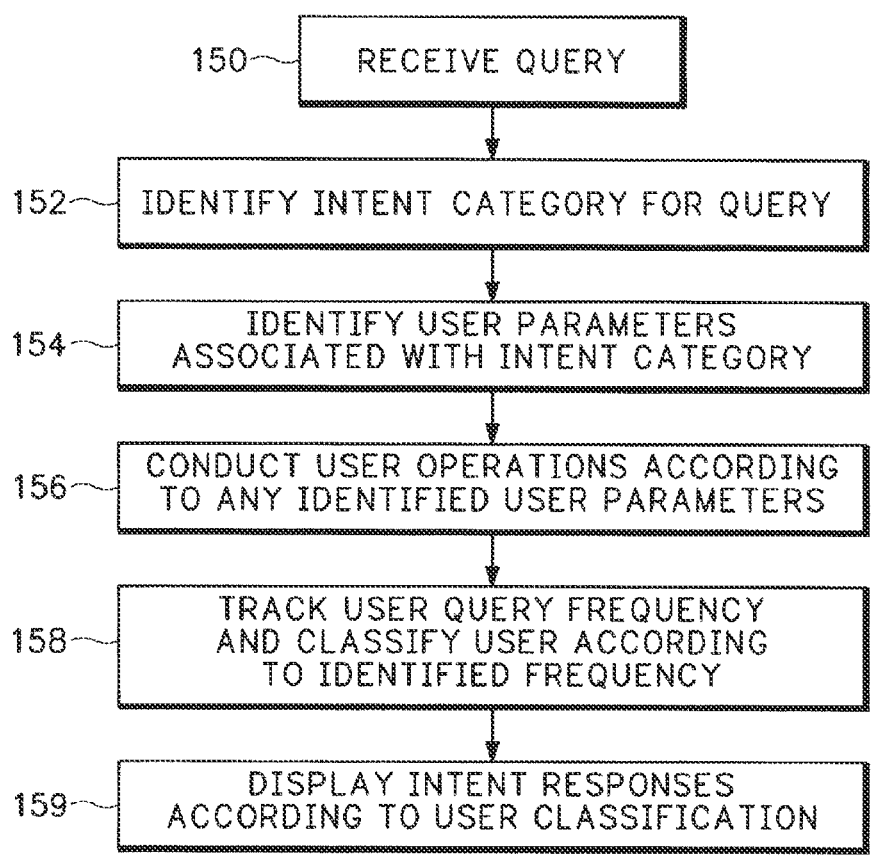
FIG. 11 is a flow diagram showing how user parameters can be associated with an intent category.

Referring to FIG. 11, any of these different user associated parameters are assigned to particular intent categories by the administrator using the intent management tool 67. The intent based search engine 35 may then receive a query in operation 150. The search engine identifies an intent category for the query in operation 152 and identifies any user parameters that may be associated with the identified intent category in operation 154.

The search engine in operation 156 conducts any user operation according to the identified user parameters. For example, the user parameter may direct the search engine in operation 158 to track the user query frequency and then classify the user according to the identified frequency. This could be used for providing special promotional materials to high frequency users. Accordingly, the user parameter may direct the search engine in operation 159 to display certain intent responses to the user according to the user classification. The user classifications can also be based on factors unrelated to user query frequency. For example, the user classifications may be based on how long the user has been signed up on the enterprise website; priority membership status, such as a platinum membership, geographic region, age, or any other user demographic.

Intent Discovery

Clustering algorithms are used for statistically associating together different information. A set of features are input into the clustering algorithm which then groups together different information according to the features. These types of conventional clustering algorithms are known to those skilled in the art, and are accordingly not described in further detail.

Figure 13:
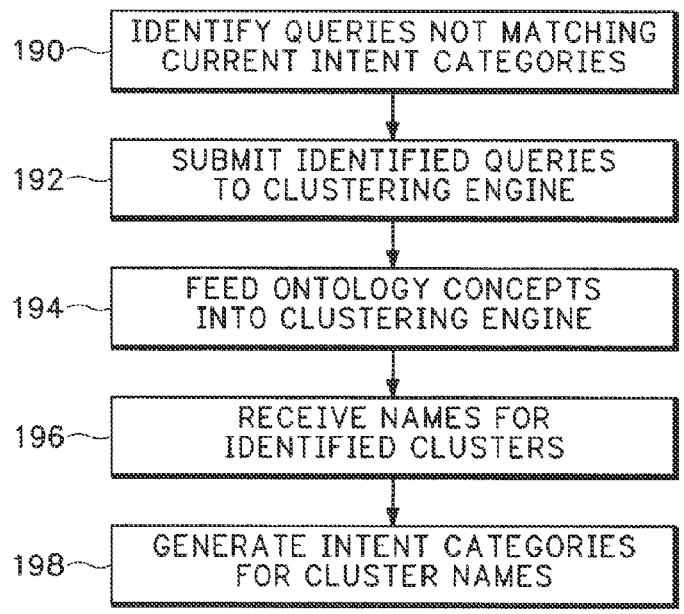
FIG. 13 is a flow diagram showing how clustering is used to generate new intent categories.

The present intent discovery scheme may provide different concepts to the clustering algorithm as features that then allow the clustering algorithm to more effectively cluster together related queries. The features provided to the clustering algorithm can be any combination of words, stems, tokens, phrases, concepts, intent categories, etc. FIG. 13 describes this intent discovery scheme in more detail. A set of queries 175 may be input to a clustering engine 186. As opposed to conventional keyword clustering, the clustering engine 186 is given at least a partial set of features 184 associated with the concepts in an enterprise specific ontology 183. For example, the stems, Cokes, phrases, and/or concepts in ontology 183 may all be associated with the concept "family vehicle".

The clustering engine 186 analyzes the queries 175 with respect to the ontology based features 184. Some higher order concepts, such as the concept "family vehicle" may get a larger weight when the queries 175 are clustered than lower order concepts, such as "vehicle models". The clustering engine 186 outputs names 188 for the identified clusters that, for example, may comprise a string of the most common terms and highest order concepts in the clusters.

Then either through a manual or automated process, IML expressions 190 are created that match the queries in the identified clusters with a particular intent category. The intent categories may use some or all of the terms from the cluster names. For example, the string of most common terms 192 contained in queries 182 may be used in the IML expression 190 to identify station wagon queries 182. Other concepts in ontology 183 can also be used in the IML expression 192 to help classify the station wagon queries 182.

Figure 12:
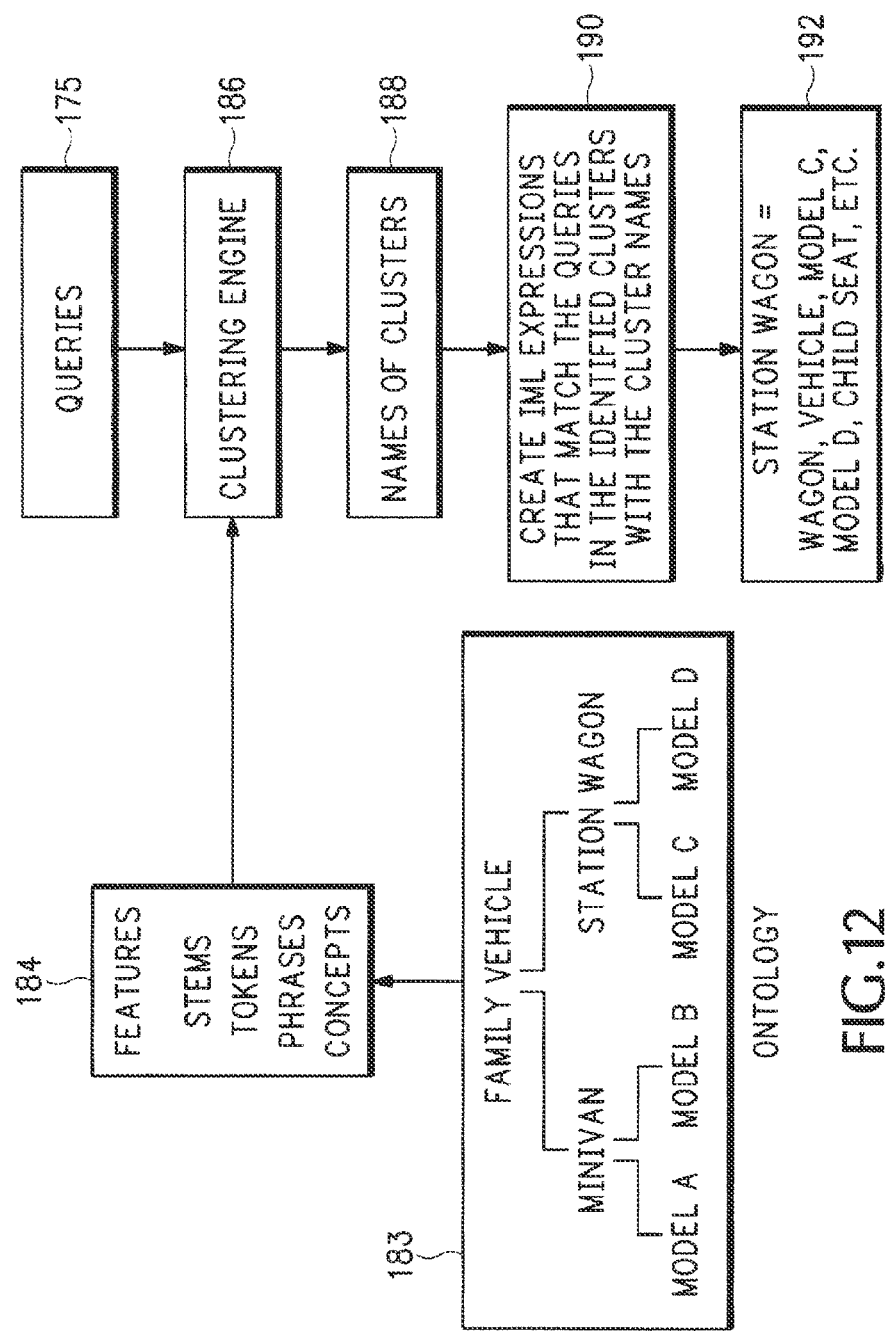
FIG. 12 is a block diagram showing how features from an ontology are used to identify query clusters.

Referring to FIG. 13, the above clustering scheme can also be used to further improve or automate intent classification. For example, the intent management tool 67 described in FIG. 4 may be used in operation 190 to identify any of the logged queries that do not match any of the existing intent categories. In operation 192, the identified queries are submitted to the clustering engine 186 in FIG. 12. In operation 194, features from one or more of the ontologies 183 in FIG. 12 are also fed into the clustering engine 186. The intent management tool 67 receives the names identified by the clustering engine in operation 196 and uses the cluster names and the identified clustered queries to generate new intent categories in operation 198.

Figure 14:
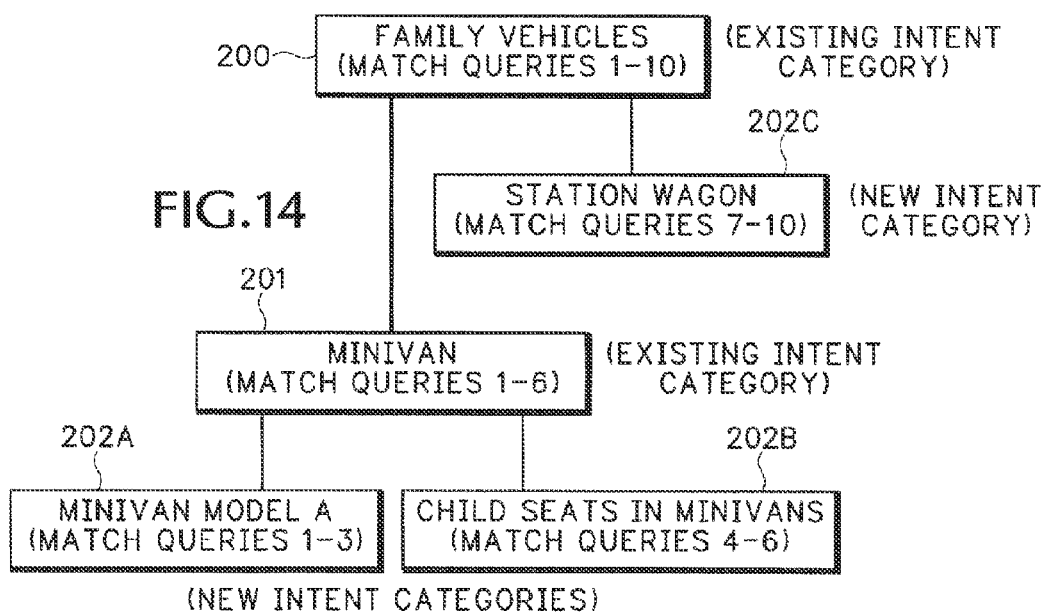
FIG. 14 is a block diagram showing how new intent categories identified in FIG. 13 are associated with different locations in an intent hierarchy.

Referring to FIG. 14, the intent discovery scheme can also be used to create intent hierarchies. For example, intent category 200 for "family vehicles" and intent subcategory 201 for "minivans" have already been created. However, the intent discovery scheme described above may have discovered three new intent categories 202A-202C.

The intent management tool 67 may compare the queries matching multiple intent categories to determine where the new intent categories 202A-202C should be located in the hierarchy. For example, the intent management tool 67 may discover that all of the queries matching new intent category 202C are a subset of the queries matching existing parent intent category 200. Further, the intent management tool 67 may also determine that the queries matching new intent category 202C do not, or rarely, overlap with the queries matching "minivan" intent category 201. Accordingly, the intent management tool 67 locates new intent category 202C as a direct child of intent category 200.

It may be determined that the queries matching the other new intent categories 202A and 202B are a subset of the queries matching existing intent category 201. Accordingly, new intent categories 202A and 202B are assigned as direct descendants of intent category 201. The intent management tool 67 may also identify new parameters for an existing intent category as described above in FIG. 10.

Response Parameters

Figure 15:
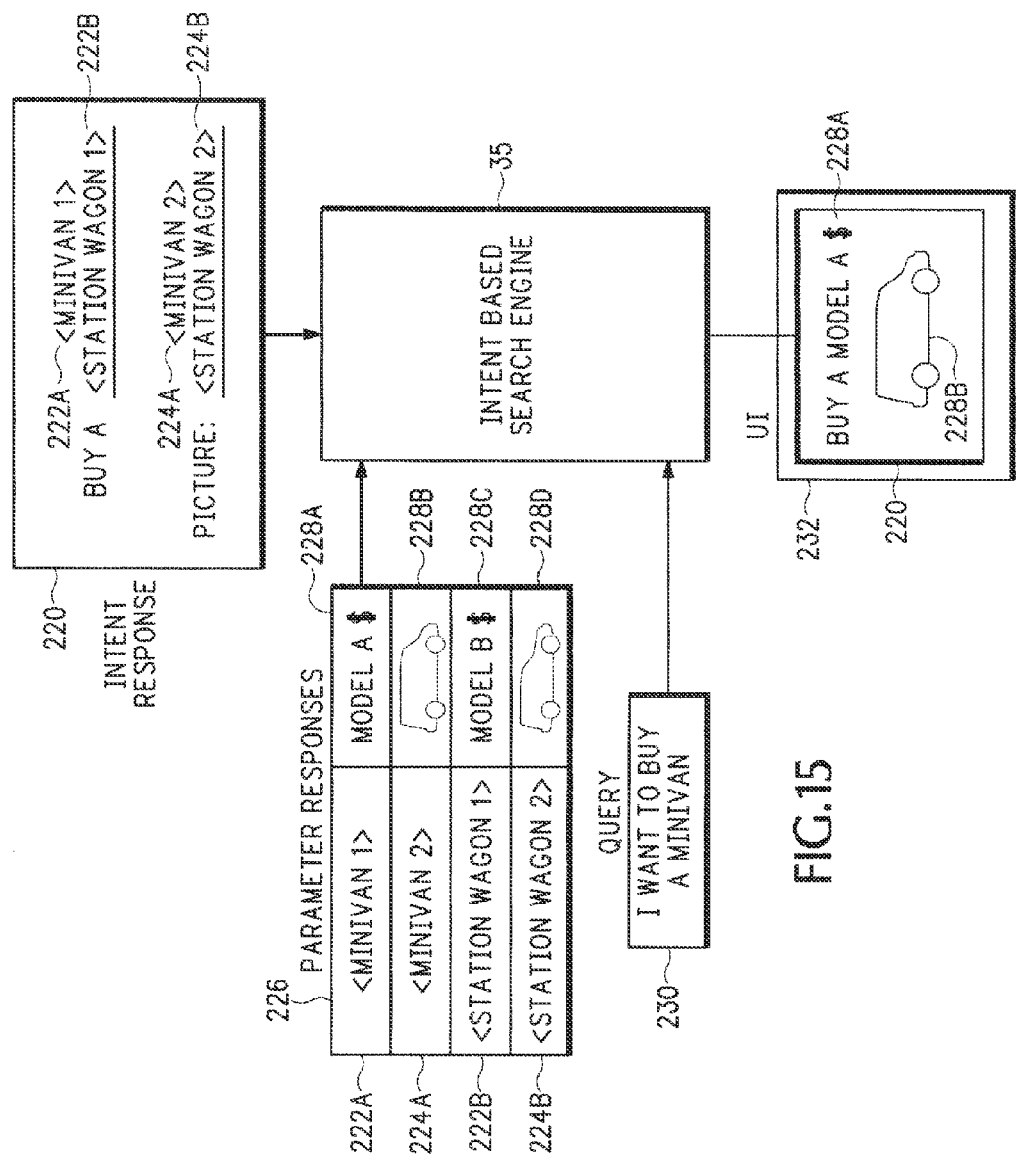
FIG. 15 is a block diagram showing how parameters can be assigned to intent responses.

FIG. 15 shows another type of parameter that can be assigned to different intent responses. An intent response 220 may comprise a template associated with a particular general category of questions. For example, the intent response 220 may be associated with an intent category related to buying and viewing a vehicle. Instead of creating a separate intent response for every specific model of vehicle that a user may ask about, the intent response 220 may include parameters 222 and 224 that are associated with specific information elements within the query.

For example, response parameter 222A may be associated with price information 228A for a particular minivan model and response parameter 222B may be associated with price information 228C for a particular station wagon model. Similarly, response parameter 224A may be associated with image information 228B for the minivan and response parameter 224B may be associated with image information 228D for the station wagon.

The intent based search engine 35 receives the query 230 and conducts the linguistic analysis described above to determine an associated intent category. The identified intent category is associated with intent response 220. The search engine 35 then compares elements in the query 230 with the response parameters 222 and 224 to determine what additional response elements 228 to insert into intent response 220.

In this example, the search engine matches the <minivan> concept parameters 222A and 224A in intent response 220 with the word minivan in query 230. Accordingly, the response elements 228A and 228B in table 226 are displayed with the intent response 220 on user interface 232. The response parameters allow an almost identical intent response 220 to be generated for all of the queries within a particular intent category and then automatically customize the intent response 220 for different query elements.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/we claim all modifications and variation coming within the spirit and scope of the following claims.

What is claimed is:

1. A method, comprising:
receiving a group of electronic representation of questions from a plurality of users over a period of time by an enterprise information system;
identifying groups of the logged questions that use a variety of different linguistic expressions to express similar information requests;
assigning intent categories applicable to each group of questions requesting similar information;
identifying ontologies associated with the intent categories;
assigning concepts in the identified ontologies as ontology parameters for the associated intent categories;
providing intent responses for the ontology parameters assigned to the intent categories;
configuring the intent responses for at least some of the intent categories, wherein each intent response provides applicable information to the questions assigned to the associated intent category;
identifying ones of the intent categories associated with at least a first threshold number of the questions, and providing the intent responses associated with said identified intent categories, wherein said providing is in response to said identification;
identifying ones of the intent categories that are not associated with at least a second threshold number of the questions, and removing intent responses for any of said identified intent categories if currently provided, wherein said removal is in response to said identification; and
for those ones of the intent categories with no associated intent response, identifying ones of the intent categories associated with at least a third threshold number of the questions, and in response to said identification, initiating generation of an intent response for each of said identified intent categories.

2. The method according to claim 1, including using ontology elements associated with the enterprise information system as features for a clustering engine and then using at least some of the cluster names generated by the clustering engine to create the intent categories.

3. The method according to claim 2, including:
identifying queries that do not match any of the created intent categories;
submitting the identified queries to the clustering engine;
generating new cluster names for the clusters of non-matching queries; and
using the new cluster names to generate additional intent categories.

4. The method according to claim 3, including:
automatically generating an intent hierarchy by identifying a new intent category having an associated set of queries that comprise a sub-set of queries for an existing intent category and identifying the new intent category as a child of the existing intent category; and identifying a new intent category having a subgroup of associated queries that comprise all of the queries matching the existing intent category and identifying the new intent category as a parent of the existing intent category.

5. The method according to claim 2, including processing queries that remain unmatched, said processing including:
   identifying relationships between the unmatched queries using the clustering engine;
   grouping the unmatched queries according to an output of the clustering engine; and
   filtering or ranking the query groupings according to the amount of queries contained therein on a per-group basis, wherein said filtering or ranking identifies a first one of the query groupings having more queries contained therein than a second different one of the filtered query groupings.

6. The method according to claim 5, wherein said processing of the queries that remain unmatched further includes:
   outputting a request to correlate the first query grouping with one of the existing intent categories or a new intent category; and
   receiving back an input assigning the first query grouping with a particular one of the existing intent categories or the new intent category;
   wherein a duration of time passes after assigning the first query grouping where the queries of the second query grouping are unassigned to the intent categories including the new intent category, wherein said duration of time is greater than zero.

7. The method according to claim 1, further comprising:
   conducting a spelling analysis to replace unidentifiable words in the questions;
   conducting a punctuation analysis to correct punctuation in the questions;
   conducting a sentence analysis to identify sentence structures and sentence elements in the questions;
   conducting a stem analysis to add and identify other forms of words to the questions;
   conducting a concept analysis using one or more ontologies to identify concepts related to the questions; and
   conducting a linguistic analysis using the identified concepts, sentence structures, sentence elements, and other added and identified forms of words, wherein the intent category assignment is based on said linguistic analysis.

8. A non-transitory storage medium comprising instructions which, when executed by one or more processors, cause the one or more processors to perform operations comprising:
   receiving a group of electronic representation of questions from a plurality of users over a period of time by an enterprise information system;
   identifying groups of the logged questions that use a variety of different linguistic expressions to express similar information requests;
   assigning intent categories applicable to each group of questions requesting similar information;
   identifying ontologies associated with the intent categories;
   assigning concepts in the identified ontologies as ontology parameters for the associated intent categories;
   providing intent responses for the ontology parameters assigned to the intent categories;
   configuring the intent responses for at least some of the intent categories, wherein each intent response provides applicable information to the questions assigned to the associated intent category;
   identifying ones of the intent categories associated with at least a first threshold number of the questions, and providing the intent responses associated with said identified intent categories, wherein said providing is in response to said identification;
   identifying ones of the intent categories that are not associated with at least a second threshold number of the questions, and removing intent responses for any of said identified intent categories if currently provided, wherein said removal is in response to said identification; and
   for those ones of the intent categories with no associated intent response, identifying ones of the intent categories associated with at least a third threshold number of the questions, and in response to said identification, initiating generation of an intent response for each of said identified intent categories.

9. The non-transitory storage medium according to claim 8, wherein the operations further comprise using ontology elements associated with the enterprise information system as features for a clustering engine and then using at least some of the cluster names generated by the clustering engine to create the intent categories.

10. The non-transitory storage medium according to claim 9, wherein the operations further comprise:
    identifying queries that do not match any of the created intent categories;
    submitting the identified queries to the clustering engine;
    generating new cluster names for the clusters of non-matching queries; and
    using the new cluster names to generate additional intent categories.

11. The non-transitory storage medium according to claim 10, wherein the operations further comprise:
    automatically generating an intent hierarchy by identifying a new intent category having an associated set of queries that comprise a sub-set of queries for an existing intent category and identifying the new intent category as a child of the existing intent category; and
    identifying a new intent category having a subgroup of associated queries that comprise all of the queries matching the existing intent category and identifying the new intent category as a parent of the existing intent category.

12. The non-transitory storage medium according to claim 9, wherein the operations further comprise processing queries that remain unmatched, said processing including:
    identifying relationships between the unmatched queries using the clustering engine;
    grouping the unmatched queries according to an output of the clustering engine; and
    filtering or ranking the query groupings according to the amount of queries contained therein on a per-group basis, wherein said filtering or ranking identifies a first one of the query groupings having more queries contained therein than a second different one of the filtered query groupings.

13. The non-transitory storage medium according to claim 12, wherein said processing of the queries that remain unmatched further includes:
    outputting a request to correlate the first query grouping with one of the existing intent categories or a new intent category; and
    receiving back an input assigning the first query grouping with a particular one of the existing intent categories or the new intent category;

wherein a duration of time passes after assigning the first query grouping where the queries of the second query grouping are unassigned to the intent categories including the new intent category, wherein said duration of time is greater than zero.

14. The non-transitory storage medium according to claim 8, wherein the operations further comprise:
conducting a spelling analysis to replace unidentifiable words in the questions;
conducting a punctuation analysis to correct punctuation in the questions;
conducting a sentence analysis to identify sentence structures and sentence elements in the questions;
conducting a stem analysis to add and identify other forms of words to the questions;
conducting a concept analysis using one or more ontologies to identify concepts related to the questions; and
conducting a linguistic analysis using the identified concepts, sentence structures, sentence elements, and other added and identified forms of words, wherein the intent category assignment is based on said linguistic analysis.

15. A system comprising:
one or more processors; and
one or more non-transitory storage media comprising instructions which, when executed by the one or more processors, cause the one or more processors to perform operations comprising:
receiving a group of electronic representation of questions from a plurality of users over a period of time by an enterprise information system;
identifying groups of the logged questions that use a variety of different linguistic expressions to express similar information requests;
assigning intent categories applicable to each group of questions requesting similar information;
identifying ontologies associated with the intent categories;
assigning concepts in the identified ontologies as ontology parameters for the associated intent categories;
providing intent responses for the ontology parameters assigned to the intent categories;
configuring the intent responses for at least some of the intent categories, wherein each intent response provides applicable information to the questions assigned to the associated intent category;
identifying ones of the intent categories associated with at least a first threshold number of the questions, and providing the intent responses associated with said identified intent categories, wherein said providing is in response to said identification;
identifying ones of the intent categories that are not associated with at least a second threshold number of the questions, and removing intent responses for any of said identified intent categories if currently provided, wherein said removal is in response to said identification; and
for those ones of the intent categories with no associated intent response, identifying ones of the intent categories associated with at least a third threshold number of the questions, and in response to said identification, initiating generation of an intent response for each of said identified intent categories.

16. The system according to claim 15, wherein the operations further comprise using ontology elements associated with the enterprise information system as features for a clustering engine and then using at least some of the cluster names generated by the clustering engine to create the intent categories.

17. The system according to claim 16, wherein the operations further comprise:
identifying queries that do not match any of the created intent categories;
submitting the identified queries to the clustering engine;
generating new cluster names for the clusters of non-matching queries; and
using the new cluster names to generate additional intent categories.

18. The system according to claim 17, wherein the operations further comprise:
automatically generating an intent hierarchy by identifying a new intent category having an associated set of queries that comprise a sub-set of queries for an existing intent category and identifying the new intent category as a child of the existing intent category; and
identifying a new intent category having a subgroup of associated queries that comprise all of the queries matching the existing intent category and identifying the new intent category as a parent of the existing intent category.

19. The system according to claim 15, wherein the operations further comprise processing queries that remain unmatched, said processing including:
identifying relationships between the unmatched queries using the clustering engine;
grouping the unmatched queries according to an output of the clustering engine; and
filtering or ranking the query groupings according to the amount of queries contained therein on a per-group basis, wherein said filtering or ranking identifies a first one of the query groupings having more queries contained therein than a second different one of the filtered query groupings.

20. The system according to claim 19, wherein said processing of the queries that remain unmatched further includes:
outputting a request to correlate the first query grouping with one of the existing intent categories or a new intent category; and
receiving back an input assigning the first query grouping with a particular one of the existing intent categories or the new intent category;
wherein a duration of time passes after assigning the first query grouping where the queries of the second query grouping are unassigned to the intent categories including the new intent category, wherein said duration of time is greater than zero.

* * * * *